United States Patent
Raghavan et al.

(10) Patent No.: US 10,791,561 B2
(45) Date of Patent: Sep. 29, 2020

(54) ELEVATION RESTRICTION BEAMFORMING IN WIRELESS SYSTEMS

(71) Applicant: QUALCOMM Incorporated, San Diego, CA (US)

(72) Inventors: Vasanthan Raghavan, West Windsor Township, NJ (US); Alessio Marcone, Nuremberg (DE); Marco Papaleo, Bologna (IT); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/513,373

(22) Filed: Jul. 16, 2019

(65) Prior Publication Data
US 2020/0077411 A1 Mar. 5, 2020

Related U.S. Application Data

(60) Provisional application No. 62/724,609, filed on Aug. 29, 2018.

(51) Int. Cl.
*H04W 72/08* (2009.01)
*H04W 72/04* (2009.01)

(52) U.S. Cl.
CPC ....... *H04W 72/082* (2013.01); *H04W 72/046* (2013.01); *H04W 72/048* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2002/0115474 A1* | 8/2002 | Yoshino | H04W 16/24 455/562.1 |
| 2012/0071102 A1* | 3/2012 | Palomar | H04W 16/14 455/63.1 |

(Continued)

OTHER PUBLICATIONS

Ericsson: "On modelling ACS for Receiver Antenna Arrays", 3GPP Draft; R4-165495, 3rd Generation Partnership Project (3GPP), Mobile Competence Centre, 650, Route Des Lucioles, F-06921 Sophia-Antipolis Cedex, France, vol. RAN WG4, No. Gothenburg, Sweden, Aug. 22, 2016-Aug. 26, 2016, Aug. 21, 2016 (Aug. 21, 2016), XP051141141, pp. 1-4, Retrieved from the Internet: URL:http://www.3gpp.org/ftp/Meetings_3GPP_SYNC/RAN4/Docs/ [retrieved on Aug. 21, 2016].

(Continued)

*Primary Examiner* — Ernest G Tacsik
(74) *Attorney, Agent, or Firm* — Qualcomm Incorporated

(57) ABSTRACT

Methods, systems, and devices for beamforming in environments with angular constraints are described. A wireless device such as a user equipment (UE) or base station may configure beam parameters based on a sensitivity level of a neighboring wireless device (e.g., a satellite). The configuration of beam parameters may be based on an interference power profile (e.g., threshold(s) indicated by an interference power profile). The interference power profile may specify a mask, which may indicate allowed or unintended directions for transmission or a transmission power mask. A beamformed transmission may be in accordance with the configured beam parameters, which may result in a reduced transmission power in one or more directions, compliance with total power limits, peak power limits, or energy radiated over a period of time, or any combination thereof.

30 Claims, 14 Drawing Sheets

(56) References Cited

U.S. PATENT DOCUMENTS

| | | | |
|---|---|---|---|
| 2014/0269627 A1* | 9/2014 | Gorokhov | H04W 72/0446 |
| | | | 370/336 |
| 2015/0079977 A1 | 3/2015 | Park et al. | |
| 2017/0195938 A1* | 7/2017 | Gomadam | H04W 16/28 |
| 2017/0207843 A1* | 7/2017 | Jung | H04B 7/0408 |
| 2018/0103381 A1 | 4/2018 | Ramamurthi et al. | |
| 2019/0268939 A1* | 8/2019 | Yang | H04W 72/042 |

OTHER PUBLICATIONS

International Search Report and Written Opinion—PCT/US2019/042158—ISA/EPO—dated Sep. 23, 2019.

* cited by examiner

ELEVATION RESTRICTION BEAMFORMING IN WIRELESS SYSTEMS

CROSS REFERENCE

The present Application for Patent claims the benefit of U.S. Provisional Patent Application No. 62/724,609 by Raghavan et al., entitled "ELEVATION RESTRICTION BEAMFORMING IN WIRELESS SYSTEMS," filed Aug. 29, 2018, assigned to the assignee hereof, and expressly incorporated herein.

INTRODUCTION

The following relates generally to wireless communications at a first wireless communications device of a wireless communications system, and more specifically to managing beamformed communications in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a first wireless communications device of a wireless communications system is described. The method may include receiving an indication of timing and directional information associated with a second wireless communications device of the wireless communications system. The method may also include determining a sensitivity level associated with the second wireless communications device based on the indication of timing and directional information. Additionally, the method may include configuring one or more beam parameters for transmission of a signal from the first wireless communications device, based on the sensitivity level associated with the second wireless communications device, and transmitting the signal in accordance with the one or more beam parameters.

An apparatus for wireless communications at a first wireless communications device of a wireless communications system is described. The apparatus may include a processor, memory in electronic communication with the processor, and instructions stored in the memory. The instructions may be executable by the processor to cause the apparatus to receive an indication of timing and directional information associated with a second wireless communications device of the wireless communications system. Similarly, the instructions may be executable to determine a sensitivity level associated with the second wireless communications device based on the indication of timing and directional information. The instructions may also be executable to configure one or more beam parameters for transmission of a signal from the first wireless communications device, based on the sensitivity level associated with the second wireless communications device, and transmit the signal in accordance with the one or more beam parameters.

Another apparatus for wireless communications at a first wireless communications device of a wireless communications system is described. The apparatus may include means for receiving an indication of timing and directional information associated with a second wireless communications device of the wireless communications system. The apparatus may also include means for determining a sensitivity level associated with the second wireless communications device based on the indication of timing and directional information. The apparatus may further include means for configuring one or more beam parameters for transmission of a signal from the first wireless communications device, based on the sensitivity level associated with the second wireless communications device, and transmitting the signal in accordance with the one or more beam parameters.

A non-transitory computer-readable medium storing code for wireless communications at a first wireless communications device of a wireless communications system is described. The code may include instructions executable by a processor to receive an indication of timing and directional information associated with a second wireless communications device of the wireless communications system. Additionally, the code may include instructions executable by the processor to determine a sensitivity level associated with the second wireless communications device based on the indication of timing and directional information. The code may also include instructions executable by the processor to configure one or more beam parameters for transmission of a signal from the first wireless communications device, based on the sensitivity level associated with the second wireless communications device, and transmit the signal in accordance with the one or more beam parameters.

Some examples of the method, apparatuses, and non-transitory computer-readable medium described herein may further include operations, features, means, or instructions for identifying an interference power profile associated with the second wireless communications device for communications from the first wireless communications device, and configuring the one or more beam parameters based on the interference power profile.

Some examples of the method, apparatuses, and non-transitory computer-readable medium described herein may further include operations, features, means, or instructions for determining a transmission direction of a main lobe for the transmission of the signal based on the sensitivity level associated with the second wireless communications device and the interference power profile. Examples of the method, apparatuses, and non-transitory computer-readable medium described herein may further include operations, features, means, or instructions for determining a transmission direction of a side lobe for the transmission of the signal based on the sensitivity level associated with the second wireless communications device and the interference power profile.

In some examples of the method, apparatuses, and non-transitory computer-readable medium described herein, the transmission direction of the main lobe may be determined such that the main lobe may be steered below a horizon, and the transmission direction of the side lobe may be determined such that the side lobe may be steered above the horizon. The side lobe may also meet a threshold indicated by the interference power profile.

In some examples of the method, apparatuses, and non-transitory computer-readable medium described herein, the threshold includes a peak power level threshold, a total transmission power threshold, a total energy over a period of time threshold, or any combination thereof.

Some examples of the method, apparatuses, and non-transitory computer-readable medium described herein may further include operations, features, means, or instructions for identifying one or more beams for wireless communications supported by the first wireless communications device and selecting a beam from the one or more beams for transmission of the signal.

Some examples of the method, apparatuses, and non-transitory computer-readable medium described herein may further include operations, features, means, or instructions for receiving one or more reference signals from a third wireless communications device and selecting the beam based on one or more directions identified based on the one or more reference signals.

Some examples of the method, apparatuses, and non-transitory computer-readable medium described herein may further include operations, features, means, or instructions for determining a transmission power of a main lobe for the transmission of the signal based on the sensitivity level associated with the second wireless communications device and the interference power profile, where a transmission direction of the main lobe may be above a horizon.

Some examples of the method, apparatuses, and non-transitory computer-readable medium described herein may further include operations, features, means, or instructions for determining transmission power and direction for the transmission of the signal based on the interference power profile, where the transmission direction may be different from a direction of the second wireless communications device.

Some examples of the method, apparatuses, and non-transitory computer-readable medium described herein may further include operations, features, means, or instructions for determining a peak power level in an intended direction, a total transmission power over all intended directions, a total energy transmitted over all intended directions for a period of time, or any combination thereof. The peak power level, total transmission power, or total energy may be based on the interference power profile, and examples of the method, apparatuses, and non-transitory computer-readable medium described herein may configure the one or more beam parameters based on the peak power level, the total transmission power, the total energy transmitted, or any combination thereof.

Some examples of the method, apparatuses, and non-transitory computer-readable medium described herein may further include operations, features, means, or instructions for identifying one or more allowed transmission directions for the transmission of the signal based on the interference power profile and configuring the one or more beam parameters based on the one or more allowed transmission directions.

Some examples of the method, apparatuses, and non-transitory computer-readable medium described herein may further include operations, features, means, or instructions for identifying one or more unintended directions based on the interference power profile and configuring a main lobe for the transmission of the signal away from the one or more unintended directions.

In some examples of the method, apparatuses, and non-transitory computer-readable medium described herein, configuring the main lobe may include operations, features, means, or instructions for refraining from transmitting via the main lobe along any of the one or more unintended directions.

In some examples of the method, apparatuses, and non-transitory computer-readable medium described herein, configuring the main lobe may include operations, features, means, or instructions for configuring the main lobe for transmitting along an unintended direction of the one or more unintended directions according to a reduced power indicated by the interference power profile.

In some examples of the method, apparatuses, and non-transitory computer-readable medium described herein, configuring the main lobe may include operations, features, means, or instructions for steering the main lobe along an unintended direction of the one or more unintended directions during specific time intervals in accordance with the interference power profile.

Some examples of the method, apparatuses, and non-transitory computer-readable medium described herein may further include operations, features, means, or instructions for receiving the indication of timing and directional information associated with the second wireless communications device from a coordinating node.

In some examples of the method, apparatuses, and non-transitory computer-readable medium described herein, the first wireless communications device operates in the same band as the second wireless communications device.

In some examples of the method, apparatuses, and non-transitory computer-readable medium described herein, the first wireless communications device operates using the same channel as the second wireless communications device.

In some examples of the method, apparatuses, and non-transitory computer-readable medium described herein, the first wireless communications device operates in a different band than the second wireless communications device.

Some examples of the method, apparatuses, and non-transitory computer-readable medium described herein may further include operations, features, means, or instructions for identifying a correlation parameter associated with a beam direction between bands used by the first wireless communications device and the second wireless communications device. Examples of the method, apparatuses, and non-transitory computer-readable medium described herein may further include operations, features, means, or instructions for configuring the one or more beam parameters based on the correlation parameter.

In some examples of the method, apparatuses, and non-transitory computer-readable medium described herein, the first wireless communications device includes a base station or a customer premises equipment.

In some examples of the method, apparatuses, and non-transitory computer-readable medium described herein, the second wireless communications device includes a base station, a customer premises equipment, a low-earth orbit (LEO) satellite, medium-earth orbit (MEO) satellite, a geo-stationary satellite, a space station receiver, or a fixed Local Multipoint Distribution Service (LMDS) link.

DETAILED DESCRIPTION

Figure 1:
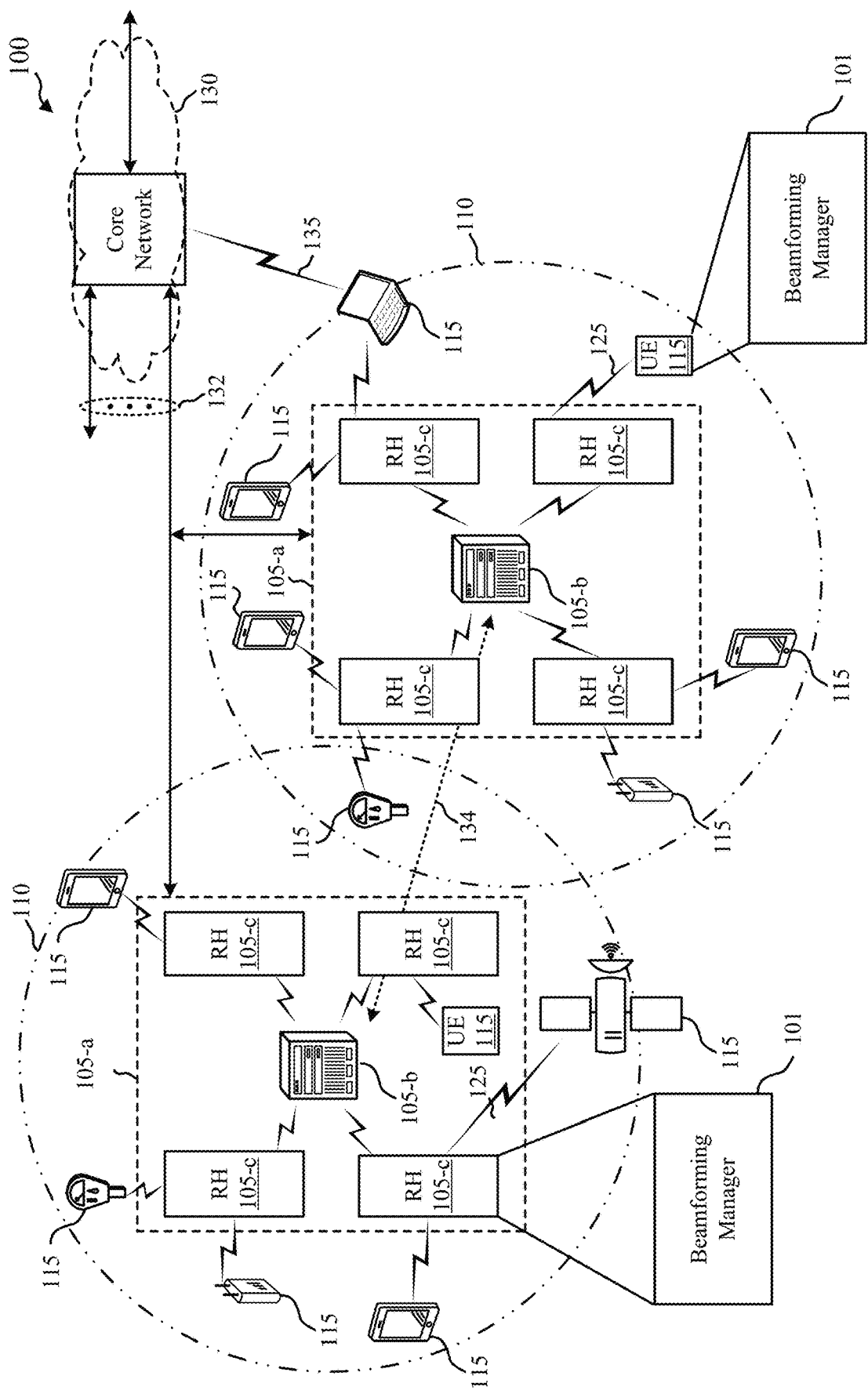
FIG. 1 illustrates an example of a wireless communications system that supports elevation restriction beamforming in wireless systems in accordance with one or more aspects of the present disclosure.

Some wireless communications systems, such as those operating in a millimeter wave (mmW) spectrum, may include base stations (e.g., gNBs) to facilitate wireless communication between a UE and the network. A network that supports communications between a base station and a UE may be referred to as an access network, while a network that supports communications between one or more base stations may be referred to as a backhaul network. Base stations that communicate with each other may do so through wired connections (e.g., fiber connections), but, in some instances, base stations may communicate wirelessly by using resources shared with the access network (e.g., in an Integrated Access and Backhaul (IAB) network). Base stations communicating wirelessly may transmit information using a beam that includes one or more lobes, where a lobe may be a direction over which a portion of transmission energy or power is directed. For example, a beam may include a main lobe, which may represent a main direction of the beam over which a first portion (e.g., a majority) of transmission power is directed, and one or more side lobes, which may represent another direction of the beam over which a second portion (e.g., a minority) of transmission power is directed. In some cases, there may be constraints on transmissions between base stations, which may complicate the signaling in wireless communications systems.

Generally, the described techniques provide for wireless devices (e.g., base stations, gNBs, customer premises equipment (CPE)) with certain angular or elevation constraints to transmit signals (e.g., signals containing information such as control or data) to other network devices in a wireless communications system. For example, angular constraints may include restraints on transmissions of the wireless communications system, and such restraints may be based on local or regional regulations, protocols or standards according to which the wireless communications system operates, resources available for the system (e.g., time resources, frequency resources, beam directions, transmission power constraints), among other factors. Elevation constraints may include restraints on transmissions due to the geography or topography in which a wireless communications system operates, such as geographical structures located within a coverage area of the wireless communications system, among others. Such angular constraints may be that network device antennas may transmit with a main beam pointing in a defined direction (e.g., below a horizon) or at or below a defined transmit power. In some cases, the angular constraints may allow for the utilization of an interference power profile that specifies a transmission power mask. A mask (e.g., a transmission power mask) may limit one or more transmission parameters for wireless communications. For instance, a transmission power mask may limit power related parameters such as the amount of total radiated power (TRP), effective isotropically radiated power (EIRP), or total radiated energy from a wireless device. The mask may be used to limit parameters in a given direction or one or more unintended directions (e.g., above the horizon) or may be used to limit parameters over a certain time period.

In some examples, a mask may be employed by a regulatory body that manages communications in a wireless communications system or may be in accordance with a standard to which wireless devices conform. In other examples, a mask may be employed by one or more wireless devices irrespective of whether a mask is employed by a regulatory body or a standard. For example, one or more wireless devices may implement a mask to improve communications reliability, to reduce interference, as part of an agreement or contract, or the like. A mask may include information regarding a horizon, where a horizon may be a horizontal line or plane defined in a coordinate system with respect to a transmitting device or with respect to an antenna array of a transmitting device. In one example, a horizon may be a horizon of the earth if a base station and a UE are at a same height. In another example, a horizon may correspond to a plane connecting a base station with a UE.

A wireless device may use information (e.g., timing information, location information) from a coordinating node to adjust parameters (e.g., transmission power, transmission direction, side lobe power), which may meet the angular constraints or threshold(s) specified by the interference power profile (e.g., a transmission power mask). In one example, a wireless device may steer its main lobe below the horizon, but signal with its side lobes above the horizon such that the side lobes meet the transmission power mask. In another example, a wireless device may determine and utilize a main beam from one or more beams with transmission directions below the horizon. Alternatively, a wireless device may steer its main lobe above the horizon in a direction of interest, but with a reduced power to meet the transmission power mask. Alternatively, a base station may steer its main lobe above the horizon at time instances when a victim node (e.g., a space station, a satellite receiver, drone, aircraft, or a local multipoint distribution service (LMDS) link) is not located in a direction of interest with respect to the base station.

Aspects of the disclosure are initially described in the context of wireless communications systems. Aspects are then described with respect to beamforming schemes and a process flow. Aspects of the disclosure are further illustrated by and described with reference to apparatus diagrams, system diagrams, and flowcharts that relate to elevation restriction beamforming in wireless systems.

FIG. 1 illustrates an example of a wireless communications system 100 that supports elevation restriction beamforming in wireless systems in accordance with one or more aspects of the present disclosure. The wireless communications system 100 includes network devices 105, UEs 115, and a core network 130. In some examples, the wireless communications system 100 may be an LTE network, an LTE-A network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

The core network 130 may provide user authentication, access authorization, tracking, IP connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (which may be known as a TRP; however, in the present disclosure, TRP will be assumed to stand for total radiated power unless otherwise specified). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band.

When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless devices (e.g., network devices 105 or UEs 115) may wirelessly transmit information to each other using directional transmissions (e.g., beams), which may be formed by utilizing antenna arrays consisting of individual antenna elements (e.g., planar antenna arrays consisting of 16×8 or 32×4 antennas). In some cases, directional transmissions sent from a wireless device may interfere with transmissions that are being sent from or received by other wireless devices (e.g., UEs 115, drones, aircraft, or satellites such as LEO or MEO satellites operating in a 24.25-27.5 GHz band). Transmissions associated with a satellite may include orbital or ephemeris data, other types of data, or a combination thereof. Wireless devices whose transmissions interfere in the manner described herein may be called aggressor nodes and the communication nodes affected by the interference may be called victim nodes.

In some examples, the transmissions associated with the victim nodes may be in the same band as the interfering transmission or a neighboring band (e.g., up to 2 GHz away from the band of the interfering transmission). Further, transmissions associated with the victim nodes that are in the same band may be in the same channel or different channels than the interfering transmissions. If the transmissions of the aggressor node and victim node are in neighboring bands, then a correlation parameter of the beam direction in the two bands may be obtained. According to some aspects, victim nodes may be located in directions above the horizon relative to the wireless device and wireless devices having transmissions directed above the horizon may interfere with victim nodes.

To limit interference between nodes, wireless devices utilizing directional transmissions may adhere to certain angular constraints used to indicate directions in which a wireless device should not intentionally transmit or directions in which a wireless device is allowed to transmit (e.g., at certain times). For example, an angular constraint may be that a wireless device is to ensure that its antenna array steers energy and/or transmits with a main beam pointing below the horizon. Such an angular constraint may help prevent transmissions of the wireless device from interfering with the communications from or intended for a victim node (e.g., a satellite receiving and/or transmitting orbital or ephemeris data), or any other wireless device that is located higher in elevation than the wireless device performing the transmission. In some cases, the angular constraint may apply specifically to wireless devices operating outdoors and not to those within a building or home, for instance.

In some examples, angular constraints may allow for adherence to a regulatory transmission power mask, which may allow for transmissions within unintended directions (e.g., above the horizon) as long as certain beam parameters (TRP, peak EIRP levels, total radiated energy, etc.) stay below threshold values (e.g., as specified by an interference power profile or mask). Unintended directions or allowed directions may be specified in the mask with respect to a coordinate system (e.g., a global coordinate system) that may provide a reference for angles or directions over a sphere around the aggressor node and which may be unambiguously interpreted based on the location and/or position of the victim node. In one example, a transmission power mask may limit peak power (e.g., EIRP) levels in unintended directions to be below a threshold (i.e., condition 1), TRP levels in unintended directions to be below a threshold (i.e., condition 2), and total energy radiated over a certain time period (e.g., a few hours) in some (e.g., unintended directions) or all directions to be below a threshold (i.e., condition 3). In some cases, condition 1 may be the most stringent (e.g., the condition with the tightest threshold value), condition 2 may be the second most stringent, and condition 3 may be the least stringent. Although condition 3 may be used as a maximum permissible exposure (MPE) constraint (e.g., for spatio-temporal averaging of the energy that a human body or skin tissue may receive due to transmission from a UE 115 in a mmW band), condition 3 may be generalized to the context of the present disclosure.

To operate in accordance with angular constraints, a wireless device (e.g., a network device 105, a UE 115) may include a beamforming manager 101, which may be used to configure beam parameters for transmission of a signal. In some examples, the beamforming manager 101 may determine (e.g., by communication with a victim node) a sensitivity level of a neighboring wireless device (e.g., a victim node such as a satellite) and may configure beam parameters based on the sensitivity level. For instance, the beamforming manager 101 may configure beam parameters to direct a transmission in a given direction and/or at a given transmission power, which may be based on threshold(s) indicated by an interference power profile. In some cases, the interference power profile may specify a mask, which may indicate allowed directions or unintended directions for transmission. The beamforming manager 101 may configure beam parameters based on the mask, which may result in a reduced transmission power in one or more directions or compliance with total power (e.g., TRP) limits, peak power (e.g., EIRP) limits, or energy radiated over a period of time.

Figure 2A:
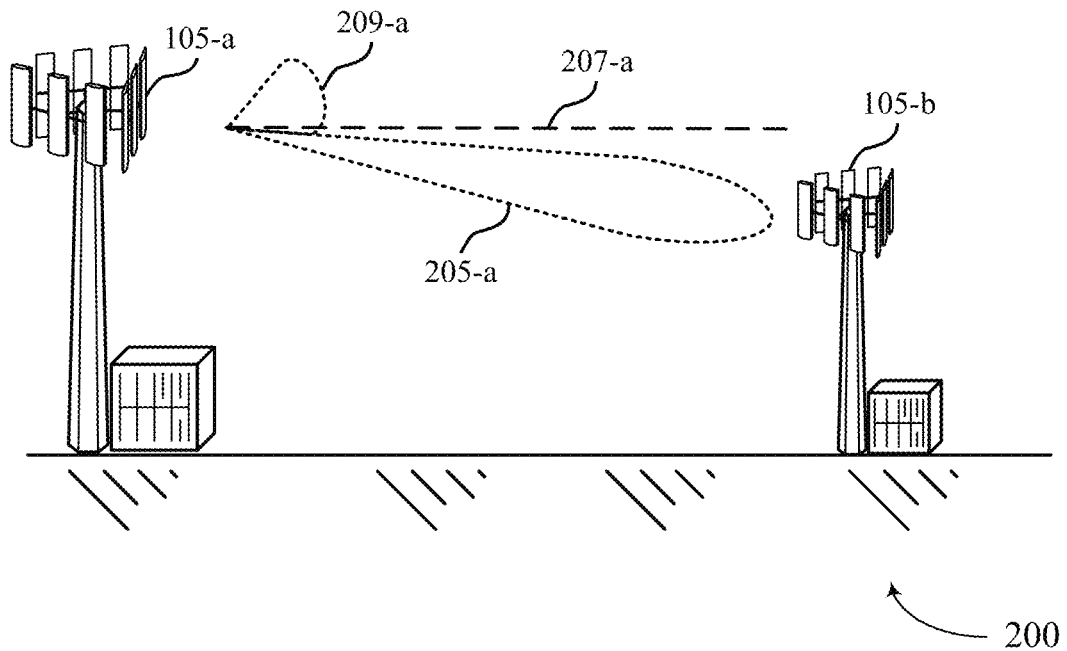
FIGS. 2A and 2B illustrate example wireless communications systems that support elevation restriction beamforming in wireless systems in accordance with one or more aspects of the present disclosure.

FIG. 2A illustrates an example of a wireless communications system 200 that supports elevation restriction beamforming in wireless systems in accordance with one or more aspects of the present disclosure. In some examples, wireless communications system 200 may implement aspects of wireless communications system 100. Wireless communications system 200 includes base stations 105-a and 105-b, which may be examples of a network device 105 as described in FIG. 1. Base station 105-a may be taller than or located at a higher elevation than base station 105-b. Though shown as base stations 105, it is noted that any set of wireless devices (e.g., a UE, a CPE, gNB) may be considered in the example of FIG. 2A without departing from the scope of the present disclosure.

Base station 105-a may communicate with base station 105-b via a beam, which may be directed below a horizon 207-a. In this case, base station 105-a may transmit a signal over the beam through line-of-sight (LOS) propagation. LOS propagation, in this case, may not violate angular or elevation constraints associated with the transmission (e.g., because a main lobe 205-a of the beam may be directed below the horizon 207-a). In some examples, the beam may have side lobes 209-a and/or corresponding leakage that are directed above the horizon 207-a. Such side lobes 209-a or corresponding leakage may, however, comply with a regulatory transmission power mask.

For instance, base station 105-b may receive information (e.g., timing or location information) and may configure side lobe 209-a based on any angular or elevation constraints determined based on the timing information, location information, or an interference power profile (e.g., a regulatory transmission power mask). Beam parameters may be configured such that certain parameters associated with the one or more side lobes (e.g., TRP, peak power (e.g., EIRP) levels, and/or total radiated energy) adhere to an associated transmission power mask.

In another example, base station 105-a may select a suitable beam from one or more beams whose transmission directions are directed below the horizon 207-a (e.g., a beam having a main lobe 205-a), which may be used to signal to base station 105-b. In some cases, base station 105-a may perform IAB-based training, which may involve the base station 105-b transmitting reference signal beams to the base station 105-a. The one or more beams from which base station 105-a selects a beam may account for some or all of the clusters (e.g., objects in the local environment that reflect or scatter some or all of the energy of a transmission beam) below the horizon because, in some cases, a transmission from the base station 105-a may be initially directed away from the antennas of the base station 105-b, and the transmission may reflect off one or more clusters such that the transmission arrives at the base station 105-b with sufficient power to be decoded. Thus, the base station 105-a may attempt to find the most optimal of beams directed below the horizon and use a beam that seems most likely to arrive at the base station 105-b and may be decoded.

Figure 2B:
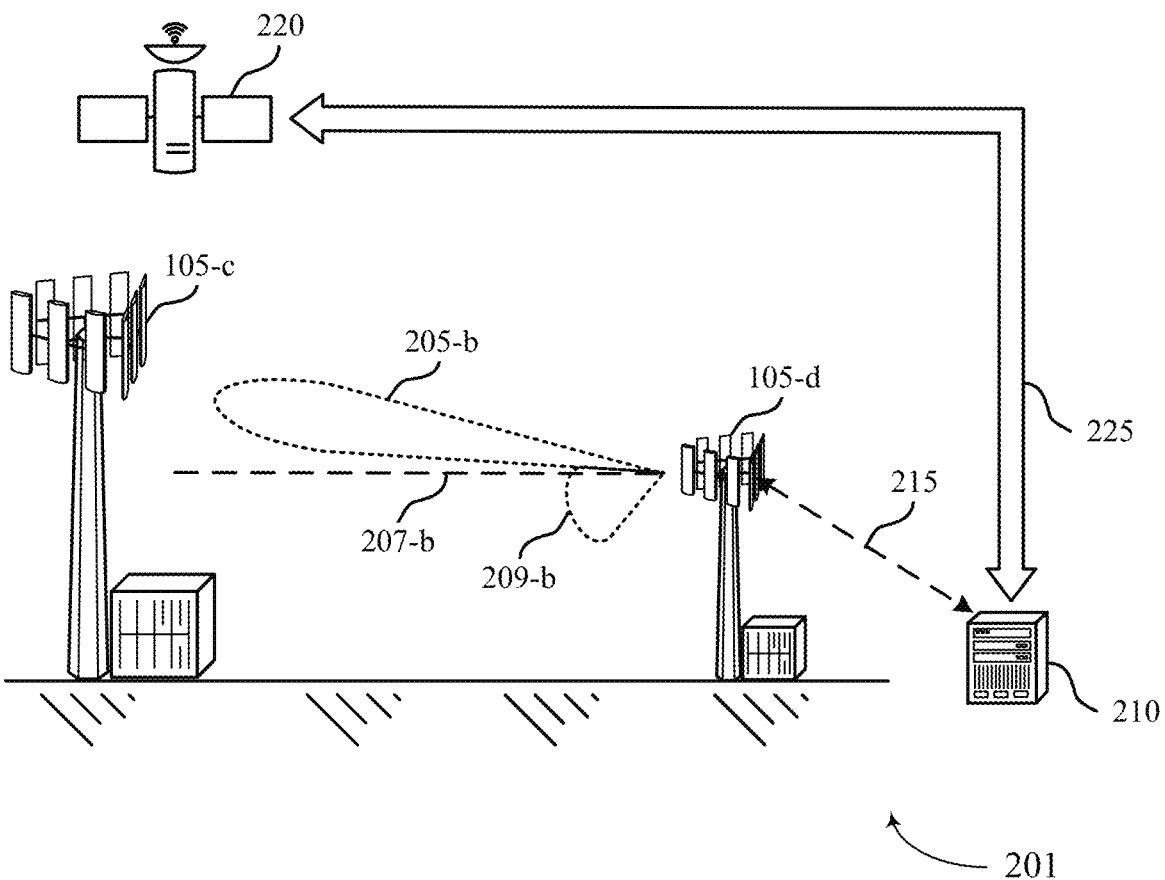

FIG. 2B illustrates an example of a wireless communications system 201 that supports elevation restriction beamforming in wireless systems. In some examples, wireless communications system 201 may implement aspects of wireless communications system 100. Wireless communications system 201 includes base stations 105-c and 105-d, which may be examples of a network device 105 as described in FIG. 1. Base station 105-c may be taller than or located at a higher elevation than base station 105-d. Though shown as base stations 105, it is noted that any set of wireless devices (e.g., a UE, a CPE, gNB) may be considered in the example of FIG. 2B without departing from the scope of the present disclosure.

In some cases, base station 105-d may determine to communicate with base station 105-c via a beam, whose main lobe 205-b may be directed above a horizon 207-b. In this case, base station 105-d may wish to transmit a signal over the beam through LOS propagation. However, in some cases, there may be certain angular or elevation constraints associated with the main lobe 205-b being directed below the horizon 207-b. Further, base station 105-d may receive information (e.g., timing or location information) from a coordinating node 210 via link 215 which may indicate that a victim node 220 is located within a range of the beam (e.g., in a given direction), where the coordinating node 210 may retrieve timing and/or location information via link 225.

Additionally or alternatively, base station 105-d may use timing and/or location information to determine a sensitivity level of victim node 220. A sensitivity level may include an indication of a high sensitivity or a low sensitivity to interference associated with transmissions from an aggressor node (e.g., base station 105-d). In some examples, a sensitivity level may be based on a configuration of the aggressor node (e.g., base station 105-d), a configuration of a victim node, a timing of one or more transmissions associated with the aggressor node and/or the victim node, a location of the aggressor node and/or the victim node, and the like. In some cases, victim node 220 may transmit an explicit indication of its sensitivity to base station 105-d. A sensitivity level at a node may be associated with a power level that is detectable by radio frequency circuitry associated with signal reception at the node.

Due to elevation or angular constraints, the proximity of victim node 220 to the direction of the beam, and/or the sensitivity level of the victim node 220, transmissions from base station 105-d may not be sent over the beam. Alternative techniques, described in the present disclosure, may be used instead.

In some examples, base station 105-d may determine to transmit information over a beam having a main lobe 205-b to base station 105-c. In this case, the base station 105-d may not be able to transmit information using LOS propagation because the direction of the main lobe 205-b above the horizon 207-b may violate an angular constraint. As such, alternative techniques may be used to ensure that the base station 105-c receives the information from the base station 105-d. Such alternative techniques may involve coordination across the base stations 105 via a coordinating node 210. In some cases, the coordinating node 210 may convey information that enables dynamic adaptation (e.g., by base station 105-d) of the power, direction, and/or beam weights of transmissions from base station 105-d, whose transmissions may then meet a regulatory transmission power mask.

The coordinating node 210 may be a local regulatory body or a local entity. A coordinating node 210 that is a local entity may perform regulatory compliance and/or collect and coordinate information to meet compliance. In general, the coordinating node 210 may convey information related to the location and/or timing of one or more potential victim nodes 220, as well as allowable or unintended transmission directions. The location of victim node 220 may be known by the coordinating node or may be determined in real time. The base station 105-d may use this information to adjust power, direction, timing, or the size of one or more lobes of the beam. Transmissions from a base station 105-d that use the information from the coordinating node 210 may be referred to herein as adaptive transmissions.

In some cases, the base station 105-d may steer the main lobe 205-b so that the main lobe 205-b is directed above the horizon 207-b towards the antenna array of the base station 105-c. However, the power of the main lobe 205-b may be reduced such that the power complies with the limitations specified by the transmission power mask. In this case, a victim node 220 (e.g., a LEO or MEO satellite) may be located (e.g., with respect to base station 105-d) in the direction of transmission, but the reduced power of the main lobe 205-b (e.g., being reduced to comply with the transmission power mask) may prevent substantial interference at the victim node 220.

In some examples, the base station 105-d may transmit a beam directed above the horizon 207-b but in a manner that avoids creating interference at victim node 220 (e.g., a LEO or MEO satellite). For example, the base station 105-d may transmit the beam using LOS propagation but at an instance of time during which the victim node 220 is not located in a same direction as the beam relative to base station 105-d. The base station 105-d may receive information from a coordinating node 210 that indicates location or timing information of potential victim nodes 220 and may use this information to transmit a beam to the base station 105-c when the victim node 220 is located outside of a range of the base station 105-d.

In some examples, the base station 105-d may coordinate its transmissions to multiple geographically-distant (e.g., separated from each other and the base station 105-d) base stations 105 in such a way that the base station 105-d minimizes the average radiated power over any specific direction (e.g., due to fast switching across the base stations 105).

According to some aspects of the present disclosure and as illustrated with reference to FIG. 3, a base station 105 may also steer a main lobe of a beam below a horizon and may signal to a second base station 105 with one or more side lobes. The one or more side lobes may be directed above the horizon and may be configured such that certain parameters (e.g., TRP, peak power (e.g., EIRP) levels, and/or total radiated energy) adhere to an associated transmission power mask. For instance, the second base station may choose a second or third side lobe of the beam in cases that the second or third side lobe of the beam adhere to the transmission power mask. Further, the parameters of the side lobe associated with the transmission power mask may be adjusted such that the side lobe complies with the transmission power mask. Such a beam may not violate the angular constraint that a main lobe be directed below the horizon (e.g., because the main lobe of the beam may point below the horizon and the parameters of the side lobe may be below threshold values defined by a transmission power mask).

Figure 3:
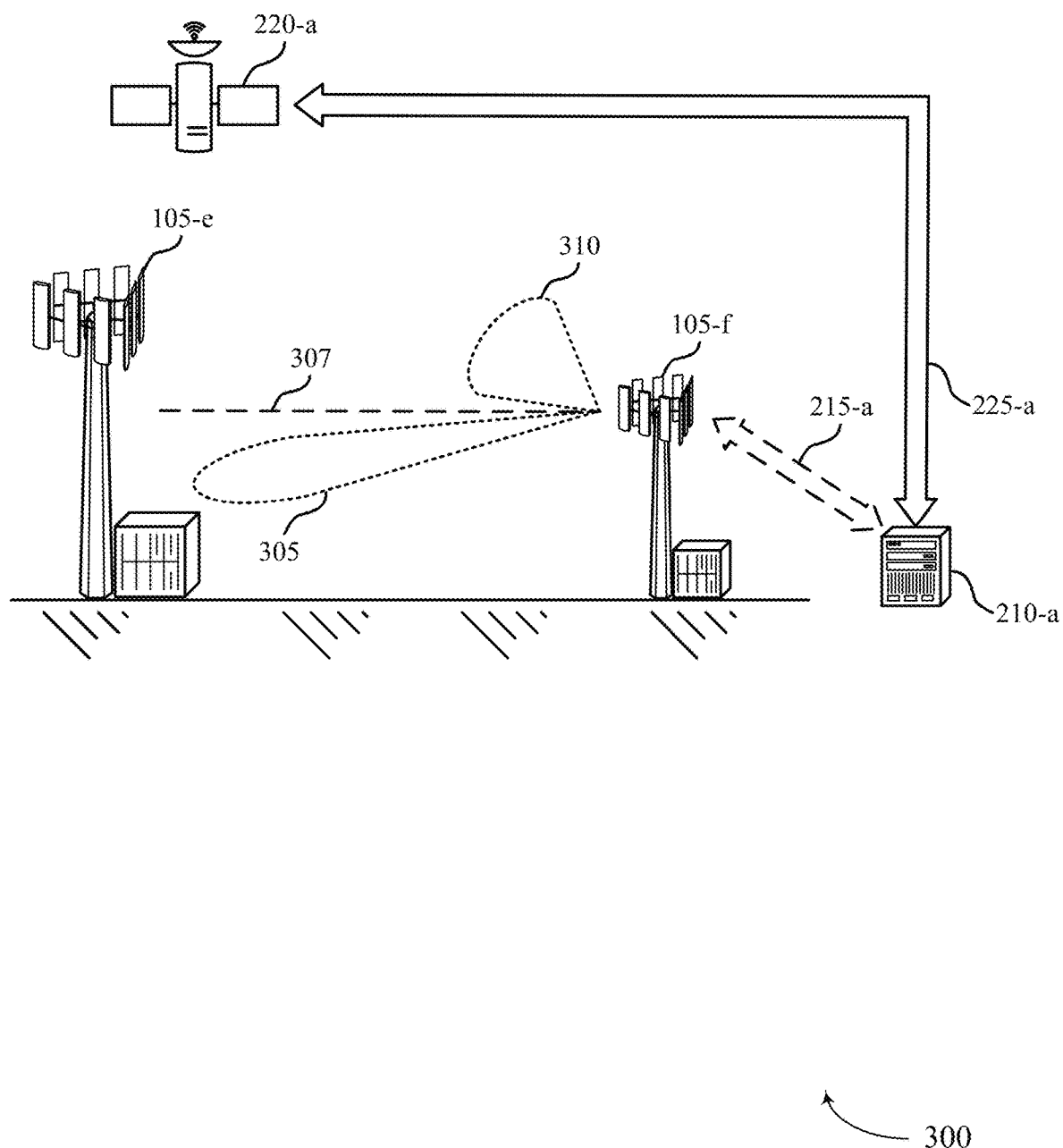
FIGS. 3 through 6 illustrate example beamforming schemes that support elevation restriction beamforming in wireless systems in accordance with one or more aspects of the present disclosure.

FIG. 3 illustrates an example of a beamforming scheme 300 that supports elevation restriction beamforming in wireless systems in accordance with one or more aspects of the present disclosure. In some examples, beamforming scheme 300 may be implemented by aspects of wireless communications systems 100 or 200. Beamforming scheme 300 includes base stations 105-e and 105-f, which may be examples of a network device 105 as described in FIG. 1. Base station 105-e may be taller than or located at a higher elevation than base station 105-f. Though shown as base stations 105, it is noted that any set of wireless devices (e.g., a UE, a CPE, gNB) may be considered in the example of FIG. 3 without departing from the scope of the present disclosure.

Beamforming scheme 300 optionally includes coordinating node 210-a, link 215-a, victim node 220-a, and link 225-a, each of which may be an example of the corresponding elements described in FIG. 2. In some cases, base station 105-e and base station 105-f may use beamforming scheme 300 based on information sent from coordinating node 210-a to base station 105-f over link 215-a. For instance, the information (e.g., timing or location of victim node 220-a) may indicate that victim node 220-a is or will be located within a range of the direction of a LOS path from base station 105-f to base station 105-e during a time of transmission from base station 105-f. Additionally or alternatively, base station 105-f may use the information to determine a sensitivity level of victim node 220-a. Based on such information (e.g., if the information indicates the victim node 220-a will be within the range or has a high sensitivity level), base station 105-e and base station 105-f may operate according to beamforming scheme 300. In other cases, base station 105-e and base station 105-f may operate according to beamforming scheme 300 without receiving information from coordinating node 210-a (e.g., the information may be received from another source, such as base station 105-e, or base station 105-f may not rely on the information).

In some cases, base station 105-f may determine to transmit a signal to base station 105-e. Base station 105-f may direct a main lobe 305 of a beam below the horizon 307 (e.g., in compliance with angular or elevation constraints). However, base station 105-f may direct a side lobe 310 (e.g., the 2nd or 3rd side lobe) of the beam above the horizon 307. Base station 105-f may then transmit the signal over side lobe 310 and base station 105-e may receive the signal. In some cases, the side lobe 310 may be chosen if the side lobe 310 complies with a regulatory transmission power mask associated with the angular or elevation constraint. For instance, the peak power (e.g., EIRP), TRP, or energy transmitted over a given time period in side lobe 310 may be less than a threshold value. Further, in some cases, base station 105-f may adjust such parameters for side lobe 310 so that the parameters comply with the regulatory transmission power mask and may transmit information over side lobe 310. The parameters of side lobe 310 associated with the regulatory transmission power mask may be limited such that victim node 220-a may be minimally or not at all impacted by the transmission of base station 105-f.

Figure 4:
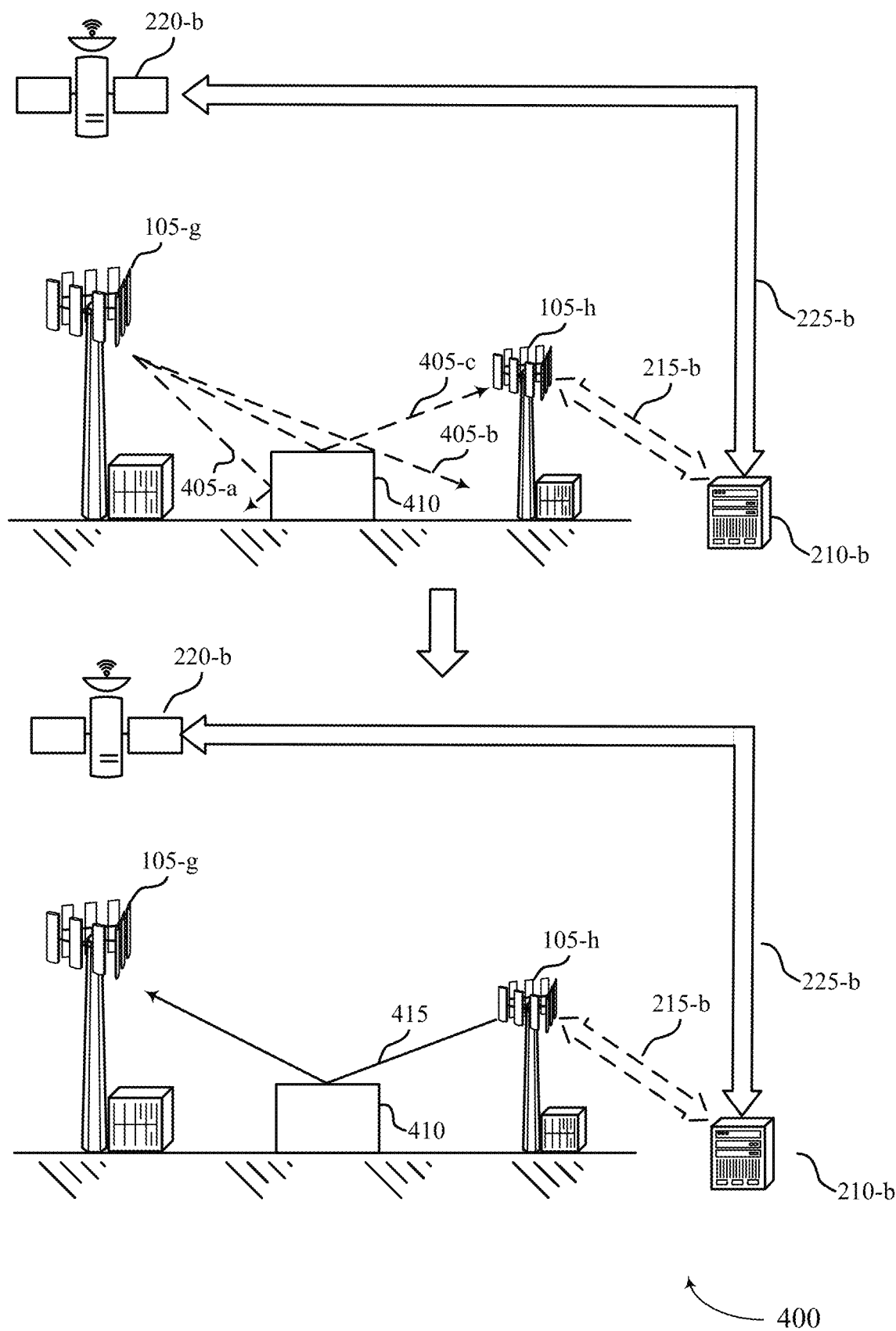

FIG. 4 illustrates an example of a beamforming scheme 400 that supports elevation restriction beamforming in wireless systems in accordance with one or more aspects of the present disclosure. In some examples, beamforming scheme 400 may be implemented by aspects of wireless communications systems 100 or 200. Beamforming scheme 400 includes base stations 105-g and 105-h, which may be examples of a network device 105 as described in FIG. 1. Base station 105-g may be taller than or located at a higher elevation than base station 105-*h*. Though shown as base stations 105, it is noted that any set of wireless devices (e.g., a UE, a CPE, gNB) may be considered in the example of FIG. 4 without departing from the scope of the present disclosure.

Beamforming scheme 400 optionally includes coordinating node 210-*b*, link 215-*b*, victim node 220-*b*, and link 225-*b*, each of which may be an example of the corresponding elements described with reference to FIG. 2. In some cases, base station 105-*g* and base station 105-*h* may use beamforming scheme 400 based on information sent from coordinating node 210-*b* to base station 105-*h* via link 215-*b*. For instance, the information (e.g., timing or location of a victim node) may indicate that victim node 220-*b* is or will be located within a range of the direction of a LOS path from base station 105-*h* to base station 105-*g* during a time of transmission from base station 105-*h*. Additionally or alternatively, base station 105-*h* may use the information to determine a sensitivity level of victim node 220-*a*. Based on such information (e.g., if the information indicates victim node 220-*b* will be within the range or that victim node 220-*b* has a high sensitivity level), base station 105-*g* and base station 105-*h* may operate according to beamforming scheme 400. In other cases, base station 105-*g* and base station 105-*h* may operate according to beamforming scheme 400 without receiving information from coordinating node 210-*b* (e.g., the information may be received from another source, such as base station 105-*g*, or base station 105-*h* may not rely on the information).

In some cases, base station 105-*h* may determine to transmit a signal to base station 105-*g*. Base station 105-*h* may choose a beam from one or more beams whose transmission directions are directed below the horizon. Choosing a beam from one or more beams may involve base station 105-*g* transmitting reference signal beams 405 to base station 105-*h*. For example, base station 105-*g* may transmit three reference signal beams 405 (e.g., reference signal beams 405-*a*, 405-*b*, and 405-*c*). Although the present example uses three reference signal beams 405, it should be noted that any number of reference signal beams 405 may be used without departing from the scope of the present disclosure.

Each of these reference signal beams 405 may be directed below the horizon but not directed in the LOS path from base station 105-*g* to base station 105-*h*. Some of the reference signal beams 405 (e.g., reference signal beams 405-*a* and 405-*c*) may reflect off a cluster 410 while others (e.g., reference signal beam 405-*b*) may continue towards base station 105-*h* without interacting with the cluster 410. Reference signal beams 405 that do not interact with or point toward the cluster 410 (e.g., reference signal beam 405-*b*) may be less likely to arrive at an antenna array of base station 105-*h* (e.g., because reference signal beams 405 that are directed downwards may reflect off the cluster 410 in order to come in contact with the antenna array of base station 105-*h*). In some cases, the cluster 410 may serve to direct a reference signal beam 405 (e.g., reference signal beam 405-*c*) towards base station 105-*h*. In other cases, the cluster 410 may serve to direct a reference signal beam 405 (e.g., reference signal beam 405-*a*) away from base station 105-*h*. Reference signal beams 405 that reflect off the cluster 410 (e.g., reference signal beam 405-*c*) and arrive at base station 105-*h* may better meet angular constraints than reference signal beams 405 (e.g., a LOS reference signal beam 405-*b*) that head straight to the array of the base station 105-*h* without reflecting off of cluster 410 (e.g., because base station 105-*h* may configure transmissions such that the main lobe of a chosen reference signal beam 405 arrives in a path along which base station 105-*h* may transmit in the opposite direction without violating angular or elevation constraints). As such, base station 105-*h* may choose the path of reference signal beam 405-*c* as a beam path for transmissions and select a beam for transmission along the beam path.

Once base station 105-*h* has chosen the beam path, base station 105-*h* may transmit the signal to base station 105-*g* along the beam path via beam 415. In some cases, the beam 415 may be directed in the opposite direction from that of the reference signal beam 405-*c* associated with the selected path. As such, beam 415 may reflect off the cluster 410 and arrive at base station 105-*g* along the same path that reference signal beam 405-*c* was transmitted. Further, as such a path is directed below the horizon and is pointing to base station 105-*g*, the beam 415 may arrive at base station 105-*g* while providing less or no impact on transmissions directed to victim node 220-*b*.

Figure 5:
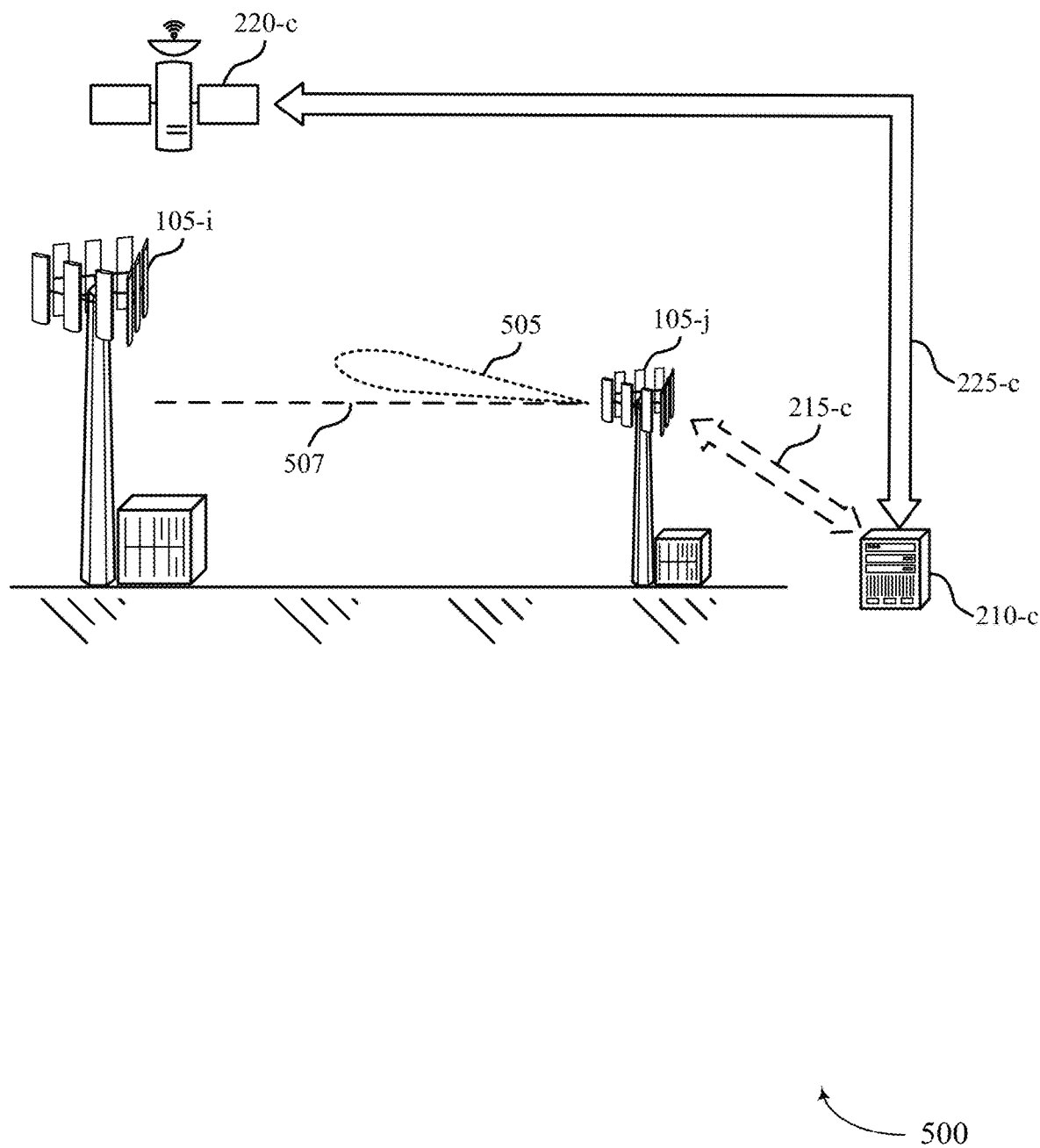

FIG. 5 illustrates an example of a beamforming scheme 500 that supports elevation restriction beamforming in wireless systems in accordance with one or more aspects of the present disclosure. In some examples, beamforming scheme 500 may be implemented by aspects of wireless communications systems 100 or 200. Beamforming scheme 500 includes base stations 105-*i* and 105-*j*, which may be examples of a network device 105 as described in FIG. 1. Base station 105-*i* may be taller than or located at a higher elevation than base station 105-*j*. Though shown as base stations 105, it is noted that any set of wireless devices (e.g., a UE, a CPE, gNB) may be considered in the example of FIG. 5 without departing from the scope of the present disclosure.

Beamforming scheme 500 optionally includes coordinating node 210-*c*, link 215-*c*, victim node 220-*c*, and link 225-*c*, each of which may be an example of the corresponding elements described with reference to FIG. 2. In some cases, base station 105-*i* and base station 105-*j* may use beamforming scheme 500 based on information sent from coordinating node 210-*c* to base station 105-*j* via link 215-*c*. For instance, the information (e.g., timing or location of a victim node) may indicate that victim node 220-*c* is or will be located within a range of the direction of a LOS path from base station 105-*j* to base station 105-*i* during a time of transmission from base station 105-*j*. Additionally or alternatively, base station 105-*j* may use the information to determine a sensitivity level of victim node 220-*c*. Based on such information (e.g., if the information indicates victim node 220-*c* will be within the range or if victim node 220-*c* has a high sensitivity level), base station 105-*i* and base station 105-*j* may operate according to beamforming scheme 500. In other cases, base station 105-*i* and base station 105-*j* may operate according to beamforming scheme 500 without receiving information from the coordinating node 210-*c* (e.g., the information may be received from another source, such as base station 105-*i*, or base station 105-*j* may not rely on the information).

In some cases, base station 105-*j* may wish to transmit a signal to base station 105-*i*. Base station 105-*j* may direct a main lobe 505 of a beam above the horizon 507 and transmit the signal via LOS propagation. Although the main lobe 505 of the beam may be directed above the horizon 507 (e.g., which may violate angular or elevation constraints), the main lobe 505 may comply with a regulatory transmission power mask. For instance, certain parameters associated with the main lobe 505 of the beam (e.g., peak power (e.g., EIRP), TRP, or energy transmitted over a given time period)

may be adjusted to comply with the regulatory transmission power mask. As such, base station 105-*h* may be able to transmit information to base station 105-*g*, even if victim node 220-*c* is located within a range of the direction of the beam path and/or has a high sensitivity level (e.g., because victim node 220-*c* may not be sensitive enough to detect transmissions from base station 105-*h*, or receive transmissions that are substantially impacted by transmissions from base station 105-*h*, when the transmissions from base station 105-*h* comply with the regulatory transmission power mask).

Figure 6:
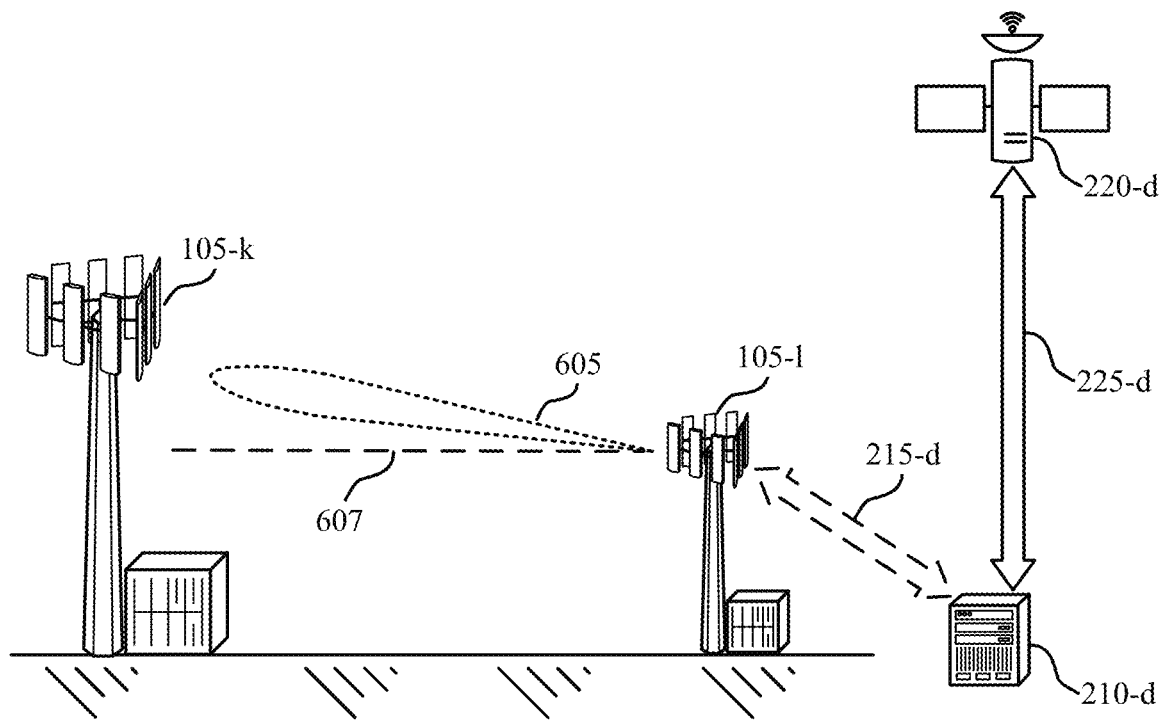

FIG. 6 illustrates an example of a beamforming scheme 600 that supports elevation restriction beamforming in wireless systems in accordance with one or more aspects of the present disclosure. In some examples, beamforming scheme 600 may be implemented by aspects of wireless communications systems 100 or 200. Beamforming scheme 600 includes base stations 105-*k* and 105-*l*, which may be examples of a network device 105 as described in FIG. 1. Base station 105-*k* may be taller than or located at a higher elevation than base station 105-*l*. Though shown as base stations 105, it is noted that any set of wireless devices (e.g., a UE, a CPE, gNB) may be considered in the example of FIG. 6 without departing from the scope of the present disclosure.

Beamforming scheme 600 includes coordinating node 210-*d*, link 215-*d*, victim node 220-*d*, and link 225-*d*, each of which may be an example of the corresponding element described with reference to FIG. 2. In some cases, base station 105-*l* may choose to use beamforming scheme 600 based on information sent from coordinating node 210-*d* to base station 105-*l* via link 215-*d*. For instance, the information (e.g., timing or location of a victim node) may indicate that victim node 220-*d* is or will be located outside of a range of the direction of a LOS path from base station 105-*l* to base station 105-*k* during a time of transmission from base station 105-*l* to base station 105-*k*. Additionally or alternatively, base station 105-*l* may use the information to determine a sensitivity level of victim node 220-*d*. Based on such information (e.g., if the information indicates victim node 220-*d* will be outside the range or that victim node 220-*d* has a low sensitivity level), base station 105-*k* and base station 105-*l* may operate according to beamforming scheme 600. In other cases, base station 105-*k* and base station 105-*l* may operate according to beamforming scheme 600 without receiving information from the coordinating node 210-*d*.

In some cases, base station 105-*l* may determine to transmit a signal to base station 105-*k* via beam, which may be directed above the horizon 607. Coordinating node 210-*d*, may retrieve or calculate location or timing information of victim node 220-*d* from information transmitted by victim node 220-*d* over link 215-*d*. Base station 105-*l* may receive information (e.g., information related to the timing or location of victim node 220-*d*) from coordinating node 210-*d* over bidirectional link 215-*d* that indicates that victim node 220-*d* is not located within a range of the direction of beam. If the information provided by coordinating node 210-*d* indicates that victim node 220-*d* is not located within a range of the direction of beam, base station 105-*l* may transmit the signal to base station 105-*k* over beam (e.g., via LOS propagation). Even though a main lobe 605 of beam may be directed above the horizon 607, the victim node 220-*d* may not be in the path of the main lobe 605 of beam, as indicated by coordinating node 210 (e.g., the amount of interference at victim node 220-*d* may be minimal).

Figure 7:
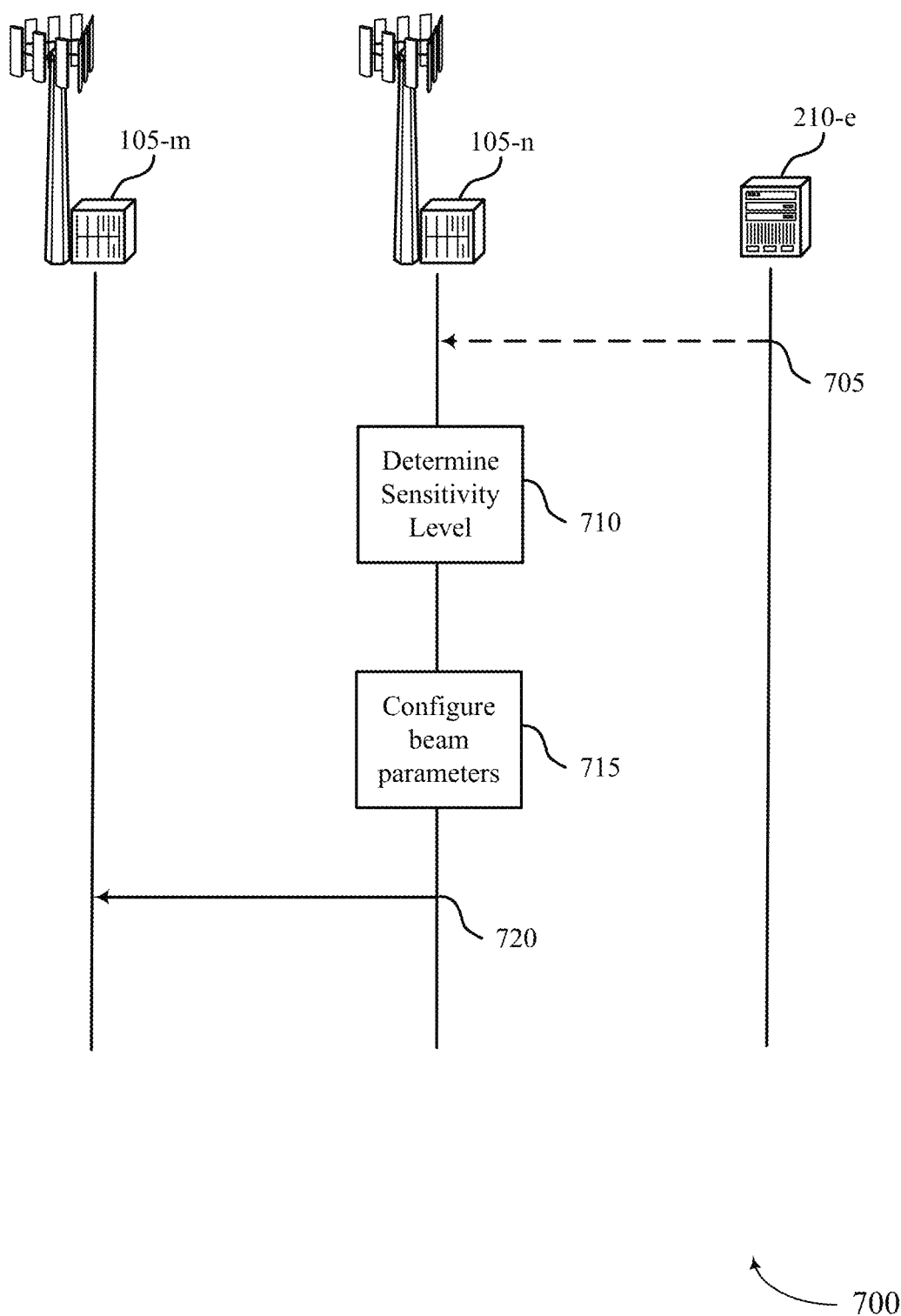
FIG. 7 illustrates an example of a process flow that supports elevation restriction beamforming in wireless systems in accordance with one or more aspects of the present disclosure.

FIG. 7 illustrates an example of a process flow 700 that supports elevation restriction beamforming in wireless systems in accordance with one or more aspects of the present disclosure. In some examples, process flow 700 may be implemented by aspects of wireless communications systems 100 or 200. The process flow may include a base station 105-*m* and a base station 105-*n*, which may be examples of a network device 105 as described in FIG. 1. Base station 105-*m* may be taller or at a higher elevation than base station 105-*n*. The process flow may further include a coordinating node 210-*e*, which may be an example of the corresponding device described reference to FIG. 2. Though shown as base stations 105, it is noted that any set of wireless devices (e.g., a UE, a CPE, gNB) may be considered in the example of FIG. 7 without departing from the scope of the present disclosure.

At 705, base station 105-*n* may receive an indication of timing and location information (which may also be known as directional information) associated with a victim node (e.g., a LEO or MEO satellite). The indication may be sent by coordinating node 210-*e* or by another source (e.g., base station 105-*m*). In some cases, the victim node may operate in a different band than base station 105-*n* or may operate in a different channel. In other cases, the victim node may operate in the same channel and band as base station 105-*n*. In the case that the victim node operates in a different band than base station 105-*n*, base station 105-*n* may identify a direction correlation parameter between at least one of the one or more bands of base station 105-*n* and at least one of the one or more bands of the victim node. A correlation parameter may indicate a correlation of beam directions in one or more bands. For example, a correlation parameter may indicate a correspondence between beam weights used in a first band and interference measured in a second band, where a signal wavelength used in the first and second band may be a same wavelength or a different wavelength. In one example, using a same set of beam weights across different bands may distort beam lobe performance and a correlation parameter may indicate the distortion caused by the beam weights.

At 710, base station 105-*n* may determine a sensitivity level associated with the victim node based on the timing and location information. For example, the base station may determine that the victim node is located within a range of the direction of a path between base station 105-*n* and base station 105-*m*. In some cases, base station 105-*n* may calculate the sensitivity level based on the timing and/or location information.

At 715, base station 105-*n* may configure one or more beam parameters for transmission of a signal. The one or more beam parameters may include TRP, peak signal power, and energy radiated over a time period in some or all directions (e.g., along a side lobe or main lobe). The one or more beam parameters may be limited to comply with a regulatory transmission power mask. Other beam parameters may include the direction of the beam or the size of the main lobe, the size of one or more of the side lobes, or a combination thereof. In some cases, the one or more beam parameters may be determined based on the sensitivity level of the satellite.

At 720, base station 105-*n* may transmit the signal, which may be received by base station 105-*m*. The parameters associated with the beam carrying the signal may be limited such that the victim node (e.g., a LEO or MEO satellite) may not detect or be prevented from normal operation by the signal.

Figure 8:
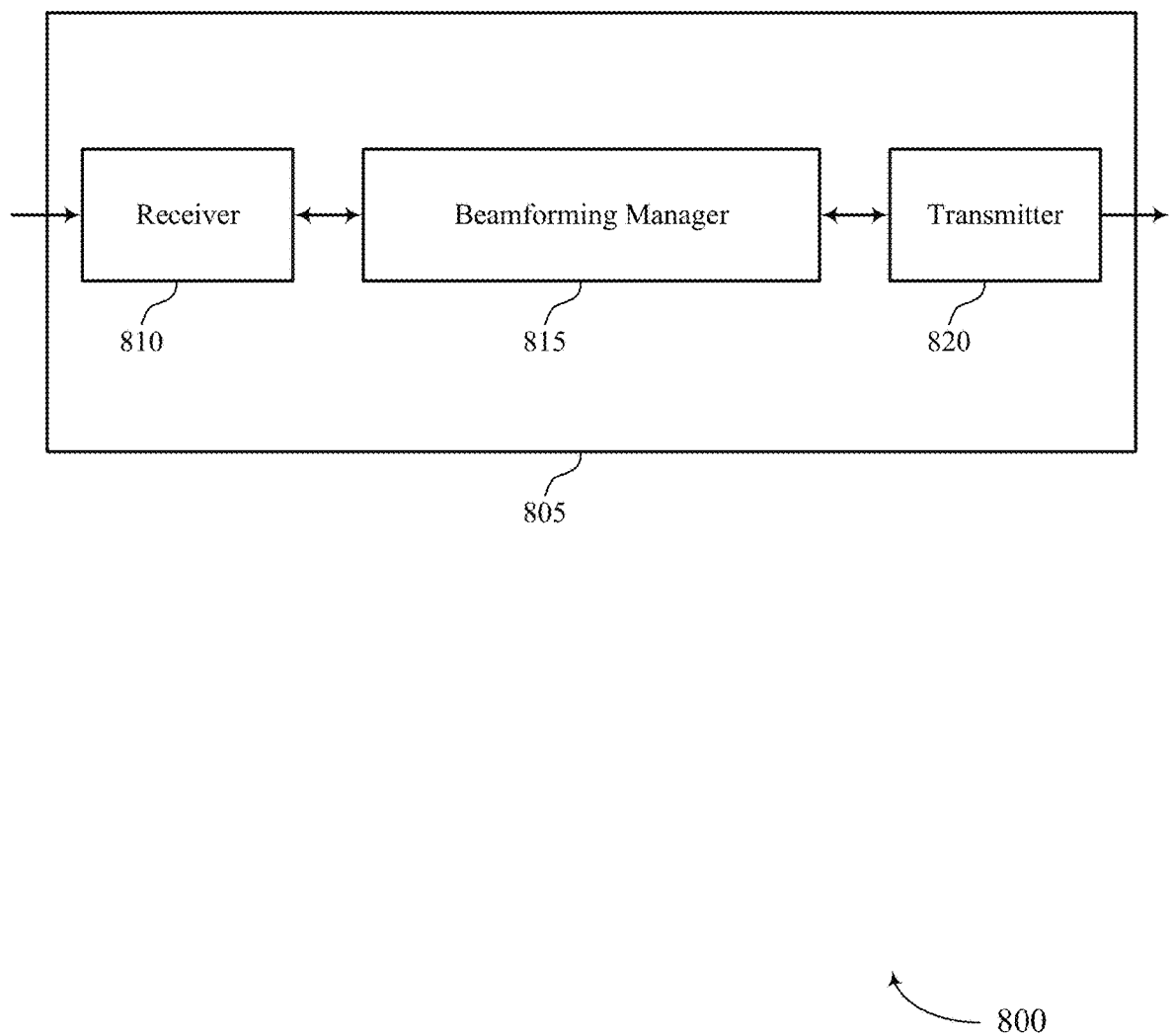
FIGS. 8 and 9 show block diagrams of devices that support elevation restriction beamforming in wireless systems in accordance with one or more aspects of the present disclosure.

FIG. 8 shows a block diagram 800 of a device 805 that supports elevation restriction beamforming in wireless systems in accordance with one or more aspects of the present disclosure. The device 805 may be an example of aspects of a wireless device such as a UE 115 or network device 105 as described herein. The device 805 may include a receiver 810, a beamforming manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to elevation restriction beamforming in wireless systems, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The beamforming manager 815 may receive an indication of timing and directional information associated with a second wireless communications device of the wireless communications system and determine a sensitivity level associated with the second wireless communications device based on the indication of timing and directional information. The beamforming manager 815 may configure one or more beam parameters for transmission of a signal from a first wireless communications device based on the sensitivity level associated with the second wireless communications device and transmit the signal in accordance with the one or more beam parameters. The beamforming manager 815 may be an example of aspects of the beamforming manager 1110 or 1210 as described herein.

The beamforming manager 815, or its sub-components, may be implemented in hardware, code (e.g., software or firmware) executed by a processor, or any combination thereof. If implemented in code executed by a processor, the functions of the beamforming manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The beamforming manager 815, or its sub-components, may be physically located at various positions, including being distributed such that portions of functions are implemented at different physical locations by one or more physical components. In some examples, the beamforming manager 815, or its sub-components, may be a separate and distinct component in accordance with various aspects of the present disclosure. In some examples, the beamforming manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
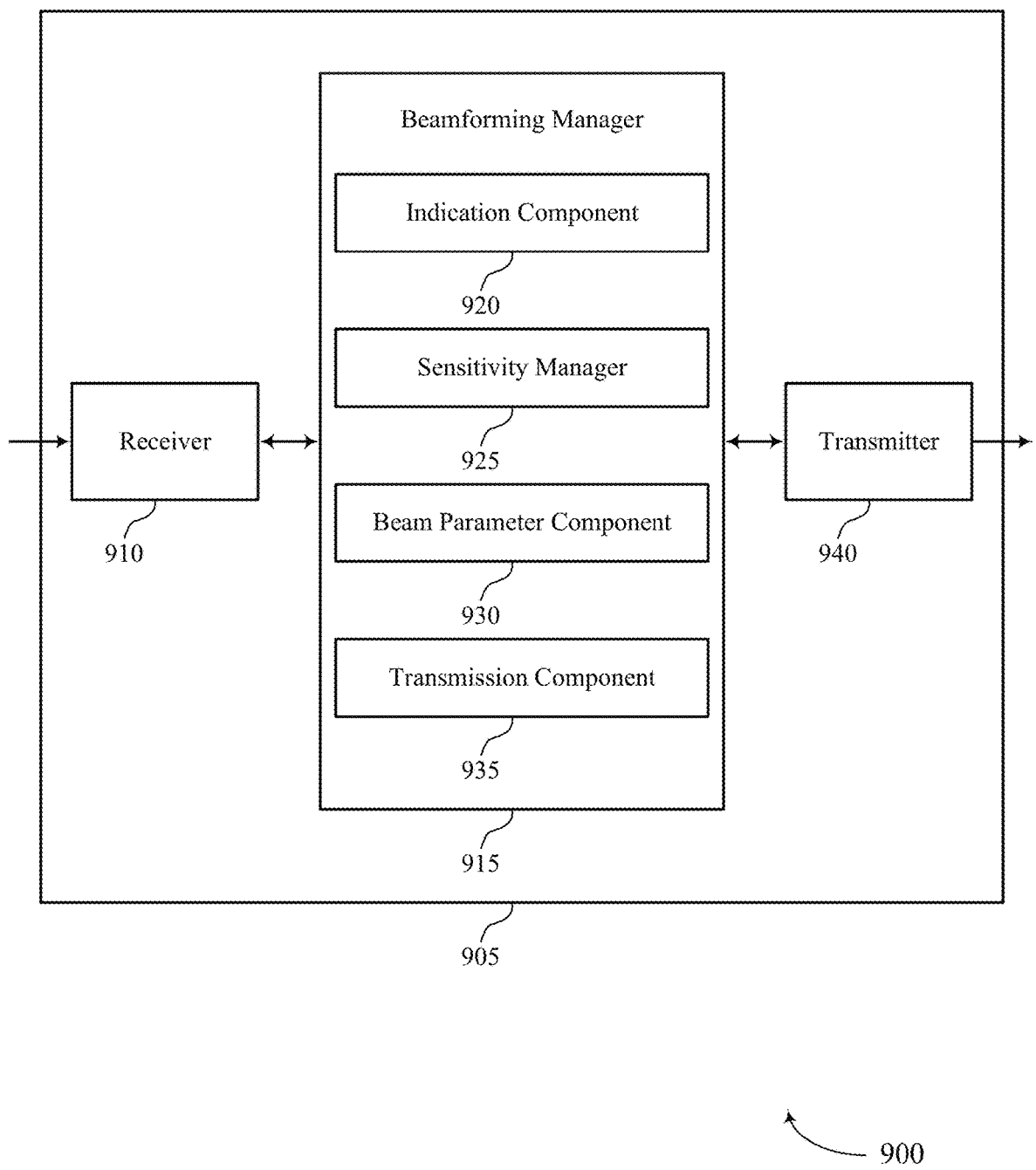

FIG. 9 shows a block diagram 900 of a device 905 that supports elevation restriction beamforming in wireless systems in accordance with one or more aspects of the present disclosure. The device 905 may be an example of aspects of a device 805, a UE 115, or a network device 105 as described herein. The device 905 may include a receiver 910, a beamforming manager 915, and a transmitter 940. The device 905 may also include a processor. Each of these components may be in communication with one another (e.g., via one or more buses).

Receiver 910 may receive information such as packets, user data, or control information associated with various information channels (e.g., control channels, data channels, and information related to elevation restriction beamforming in wireless systems, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The beamforming manager 915 may be an example of aspects of the beamforming manager 815 as described herein. The beamforming manager 915 may include an indication component 920, a sensitivity manager 925, a beam parameter component 930, and a transmission component 935. The beamforming manager 915 may be an example of aspects of the beamforming manager 1110 or 1210 as described herein.

The indication component 920 may receive an indication of timing and directional information associated with a second wireless communications device of the wireless communications system.

The sensitivity manager 925 may determine a sensitivity level associated with the second wireless communications device based on the indication of timing and directional information.

The beam parameter component 930 may configure one or more beam parameters for transmission of a signal from a first wireless communications device based on the sensitivity level associated with the second wireless communications device.

The transmission component 935 may transmit the signal in accordance with the one or more beam parameters.

Transmitter 940 may transmit signals generated by other components of the device 905. In some examples, the transmitter 940 may be collocated with a receiver 910 in a transceiver module. For example, the transmitter 940 may be an example of aspects of the transceiver 1120 or 1220 as described with reference to FIGS. 11 and 12. The transmitter 940 may utilize a single antenna or a set of antennas.

Figure 10:
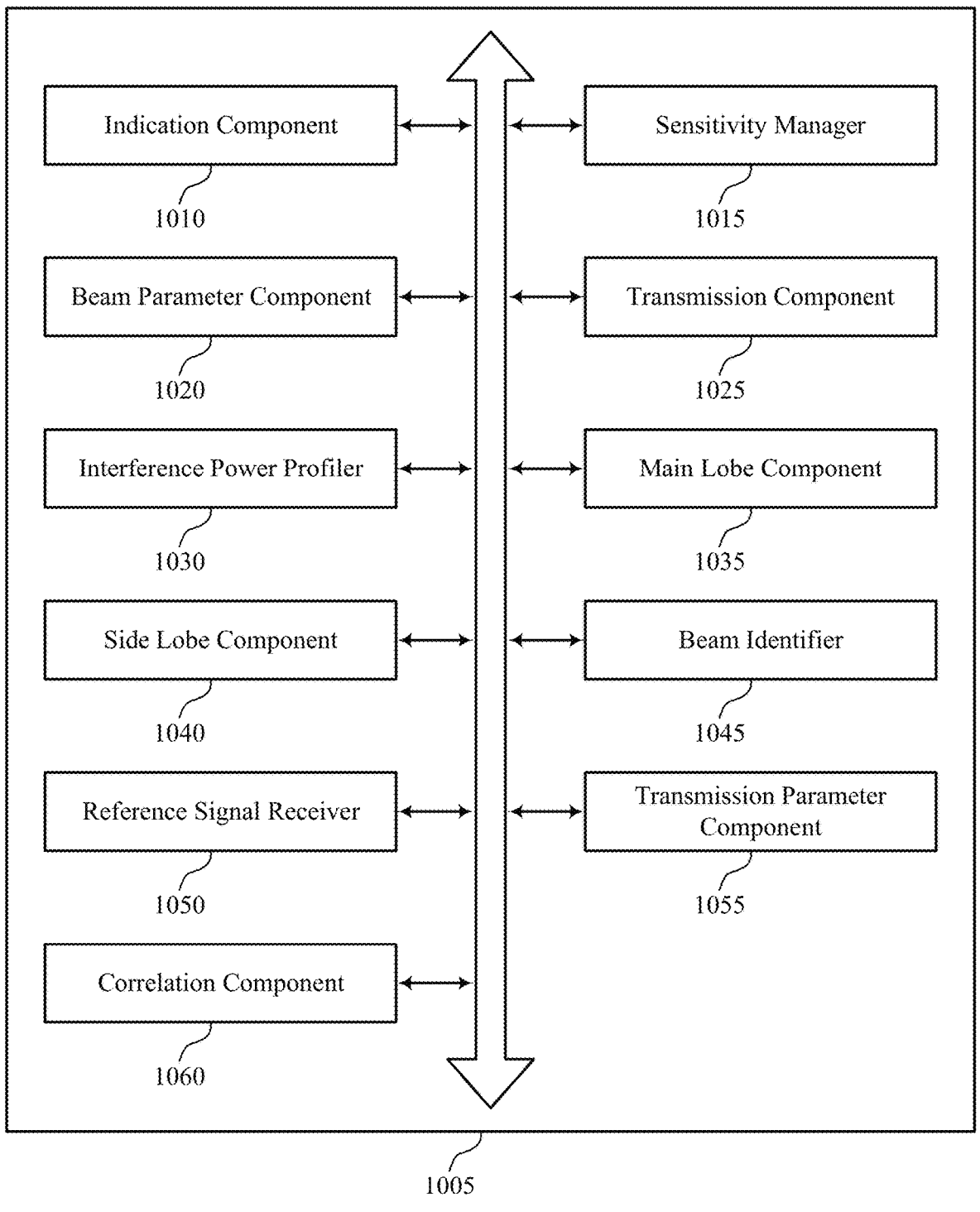
FIG. 10 shows a block diagram of a beamforming manager that supports elevation restriction beamforming in wireless systems in accordance with one or more aspects of the present disclosure.

FIG. 10 shows a block diagram 1000 of a beamforming manager 1005 that supports elevation restriction beamforming in wireless systems in accordance with one or more aspects of the present disclosure. The beamforming manager 1005 may be an example of aspects of a beamforming manager 815, a beamforming manager 915, or a beamforming manager 1110 described herein. The beamforming manager 1005 may include an indication component 1010, a sensitivity manager 1015, a beam parameter component 1020, a transmission component 1025, an interference power profiler 1030, a main lobe component 1035, a side lobe component 1040, a beam identifier 1045, a reference signal receiver 1050, a transmission parameter component 1055, and a correlation component 1060. Each of these modules may communicate, directly or indirectly, with one another (e.g., via one or more buses).

The indication component 1010 may receive an indication of timing and directional information associated with a second wireless communications device of the wireless communications system. In some examples, the indication component 1010 may receive the indication of timing and directional information associated with the second wireless communications device from a coordinating node. In some cases, a first wireless communications device operates in the same band as the second wireless communications device. In some aspects, the first wireless communications device operates using the same channel as the second wireless communications device. In some instances, the first wireless communications device operates in a different band than the second wireless communications device.

In some cases, the first wireless communications device includes a base station or a customer premises equipment. In some examples, the second wireless communications device includes a base station, a customer premises equipment, a LEO satellite, a MEO satellite, a geostationary satellite, a space station receiver, or a fixed LMDS link.

The sensitivity manager 1015 may determine a sensitivity level associated with the second wireless communications device based on the indication of timing and directional information.

The beam parameter component 1020 may configure one or more beam parameters for transmission of a signal from the first wireless communications device based on the sensitivity level associated with the second wireless communications device. In some examples, the beam parameter component 1020 may configure the one or more beam parameters based on an interference power profile. In some cases, the beam parameter component 1020 may configure the one or more beam parameters based on the peak power level, the total transmission power, the total energy transmitted, or any combination thereof. In some aspects, the beam parameter component 1020 may configure the one or more beam parameters based on one or more allowed transmission directions. In some instances, the beam parameter component 1020 may configure the one or more beam parameters based on a correlation parameter.

The transmission component 1025 may transmit the signal in accordance with the one or more beam parameters.

The interference power profiler 1030 may identify an interference power profile associated with the second wireless communications device for communications from the first wireless communications device.

The main lobe component 1035 may determine a transmission direction of a main lobe for the transmission of the signal based on the sensitivity level associated with the second wireless communications device and the interference power profile. In some examples, the main lobe component 1035 may determine a transmission power of a main lobe for the transmission of the signal based on the sensitivity level associated with the second wireless communications device and the interference power profile, where a transmission direction of the main lobe is above a horizon. In some cases, the main lobe component 1035 may configure a main lobe for the transmission of the signal away from the one or more unintended directions. In some aspects, the main lobe component 1035 may refrain from transmitting via the main lobe along any of the one or more unintended directions. In some instances, the main lobe component 1035 may configure the main lobe for transmitting along an unintended direction of the one or more unintended directions according to a reduced power indicated by the interference power profile.

In some examples, the main lobe component 1035 may steer the main lobe along an unintended direction of the one or more unintended directions during specific time intervals in accordance with the interference power profile. In some cases, the transmission direction of the main lobe is determined such that the main lobe is steered below a horizon.

The side lobe component 1040 may determine a transmission direction of a side lobe for the transmission of the signal based on the sensitivity level associated with the second wireless communications device and the interference power profile. In some cases, the transmission direction of the side lobe is determined such that the side lobe is steered above the horizon and meets a threshold indicated by the interference power profile. In some examples, the threshold includes a peak power level threshold, a total transmission power threshold, a total energy over a period of time threshold, or any combination thereof.

The beam identifier 1045 may identify one or more beams for wireless communications supported by the first wireless communications device. In some examples, the beam identifier 1045 may select a beam from the one or more beams for transmission of the signal. In some aspects, the beam identifier 1045 may select the beam based on one or more directions identified based on the one or more reference signals.

The reference signal receiver 1050 may receive one or more reference signals from a third wireless communications device.

The transmission parameter component 1055 may determine transmission power and direction for the transmission of the signal based on the interference power profile, where the transmission direction is different from a direction of the second wireless communications device. In some examples, the transmission parameter component 1055 may determine a peak power level in an intended direction, a total transmission power over all intended directions, a total energy transmitted over all intended directions for a period of time, or any combination thereof based on the interference power profile. In some aspects, the transmission parameter component 1055 may identify one or more allowed transmission directions for the transmission of the signal based on the interference power profile. In some instances, the transmission parameter component 1055 may identify one or more unintended directions based on the interference power profile.

The correlation component 1060 may identify a correlation parameter associated with a beam direction between bands used by the first wireless communications device and the second wireless communications device.

Figure 11:
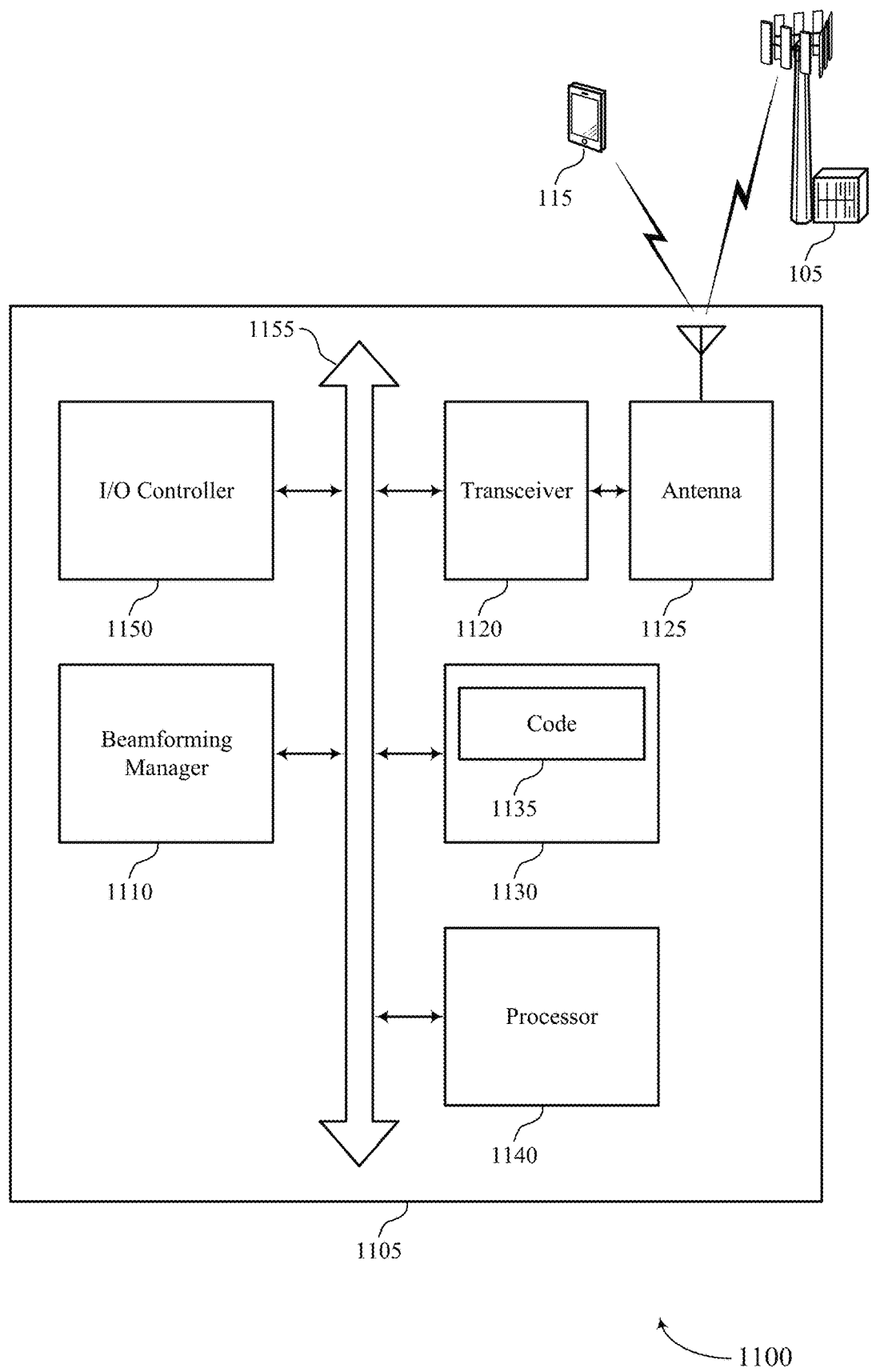
FIG. 11 shows a diagram of a system including a UE that supports elevation restriction beamforming in wireless systems in accordance with one or more aspects of the present disclosure.

FIG. 11 shows a diagram of a system 1100 including a device 1105 that supports elevation restriction beamforming in wireless systems in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a beamforming manager 1110, a transceiver 1120, an antenna 1125, memory 1130, a processor 1140, and an I/O controller 1150. These components may be in electronic communication via one or more buses (e.g., bus 1155).

The beamforming manager 1110 may receive an indication of timing and directional information associated with a second wireless communications device of the wireless communications system and determine a sensitivity level associated with the second wireless communications device based on the indication of timing and directional information. The beamforming manager 1110 may configure one or more beam parameters for transmission of a signal from a first wireless communications device based on the sensitivity level associated with the second wireless communications device and transmit the signal in accordance with the one or more beam parameters.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM), read only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting elevation restriction beamforming in wireless systems).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications at a first wireless communications device of a wireless communications system. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
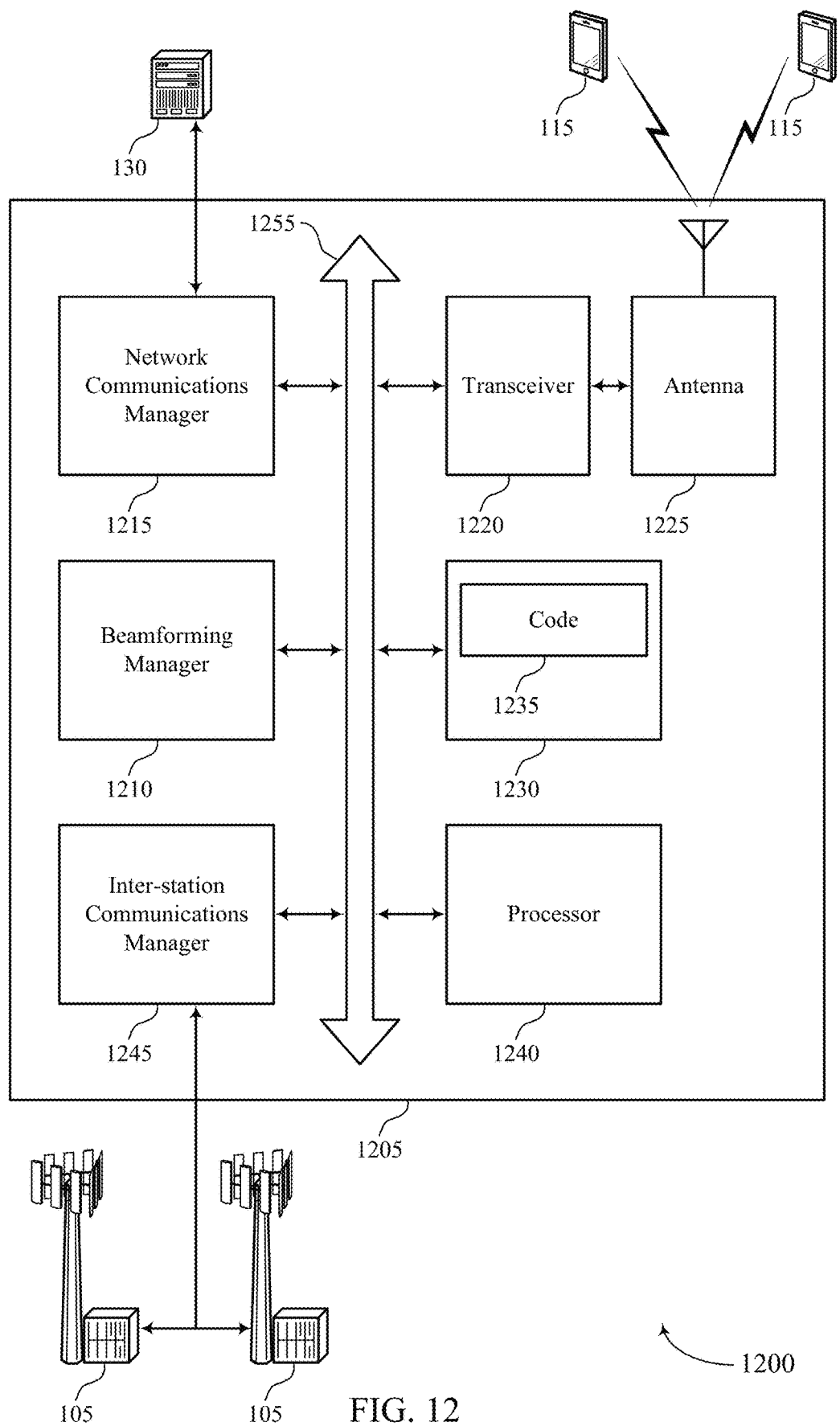
FIG. 12 shows a diagram of a system including a base station that supports elevation restriction beamforming in wireless systems in accordance with one or more aspects of the present disclosure.

FIG. 12 shows a diagram of a system 1200 including a device 1205 that supports elevation restriction beamforming in wireless systems in accordance with one or more aspects of the present disclosure. The device 1205 may be an example of or include the components of device 805, device 905, or a network device 105 as described herein. The device 1205 may include components for bi-directional voice and data communications including components for transmitting and receiving communications, including a beamforming manager 1210, a network communications manager 1215, a transceiver 1220, an antenna 1225, memory 1230, a processor 1240, and an inter-station communications manager 1245. These components may be in electronic communication via one or more buses (e.g., bus 1255).

The beamforming manager 1210 may receive an indication of timing and directional information associated with a second wireless communications device of the wireless communications system and determine a sensitivity level associated with the second wireless communications device based on the indication of timing and directional information. The beamforming manager 1210 may configure one or more beam parameters for transmission of a signal from a first wireless communications device based on the sensitivity level associated with the second wireless communications device and transmit the signal in accordance with the one or more beam parameters.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting elevation restriction beamforming in wireless systems).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications at a first wireless communications device of a wireless communications system. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
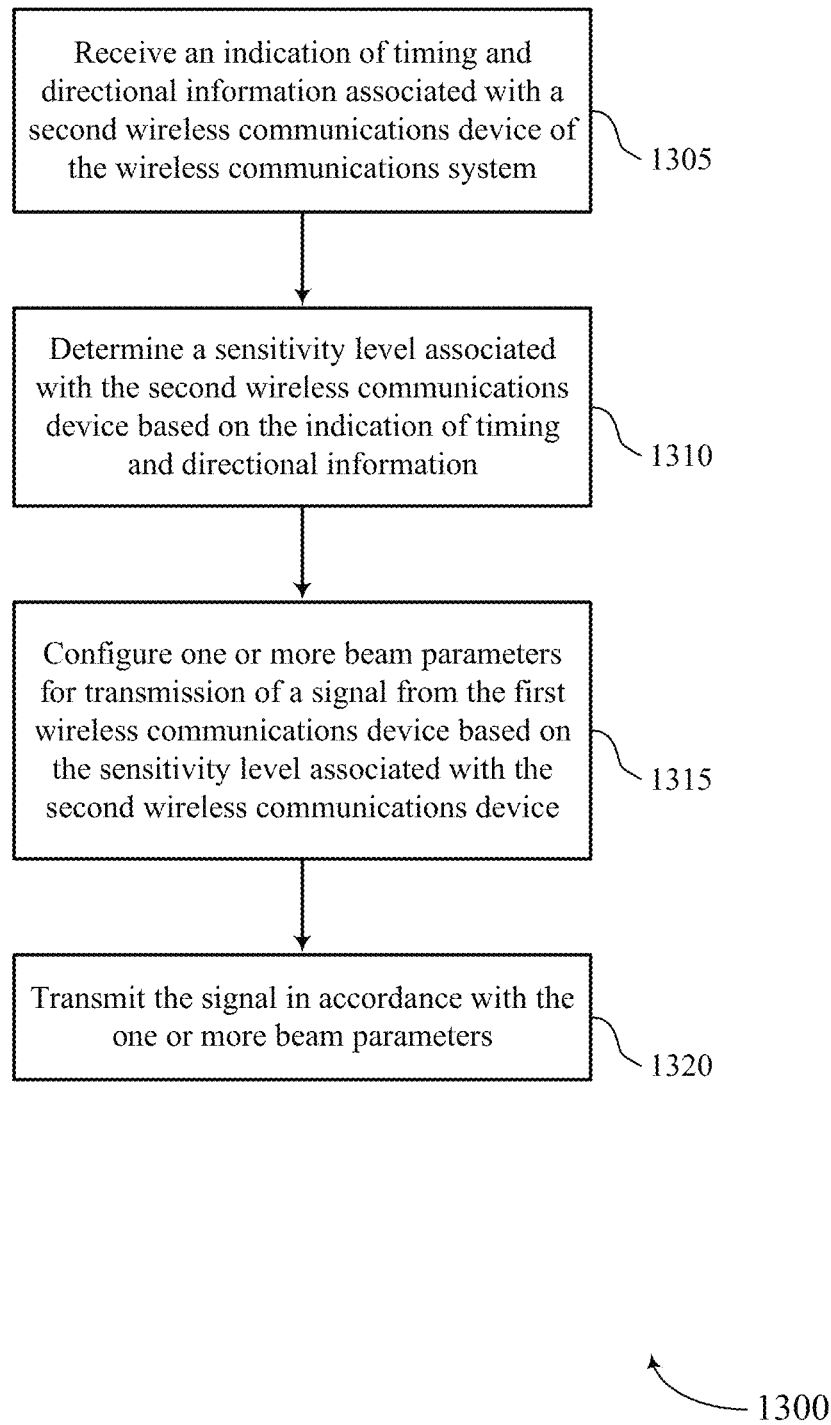
FIGS. 13 and 14 show flowcharts illustrating methods that support elevation restriction beamforming in wireless systems in accordance with one or more aspects of the present disclosure.

FIG. 13 shows a flowchart illustrating a method 1300 that supports elevation restriction beamforming in wireless systems in accordance with one or more aspects of the present disclosure. The operations of method 1300 may be implemented by a wireless device such as a UE 115 or network device 105 or its components as described herein. For example, the operations of method 1300 may be performed by a beamforming manager as described with reference to FIGS. 8 through 12. In some examples, the wireless device may execute a set of instructions to control the functional elements of the wireless device to perform the functions described below. Additionally or alternatively, the wireless device may perform aspects of the functions described below using special-purpose hardware.

At 1305, the wireless device may receive an indication of timing and directional information associated with a second wireless communications device of the wireless communications system. The operations of 1305 may be performed according to the methods described herein. In some examples, aspects of the operations of 1305 may be performed by an indication component as described with reference to FIGS. 8 through 12.

At 1310, the wireless device may determine a sensitivity level associated with the second wireless communications device based on the indication of timing and directional information. The operations of 1310 may be performed according to the methods described herein. In some examples, aspects of the operations of 1310 may be performed by a sensitivity manager as described with reference to FIGS. 8 through 12.

At 1315, the wireless device may configure one or more beam parameters for transmission of a signal from the wireless device based on the sensitivity level associated with the second wireless communications device. The operations of 1315 may be performed according to the methods described herein. In some examples, aspects of the operations of 1315 may be performed by a beam parameter component as described with reference to FIGS. 8 through 12.

At 1320, the wireless device may transmit the signal in accordance with the one or more beam parameters. The operations of 1320 may be performed according to the methods described herein. In some examples, aspects of the operations of 1320 may be performed by a transmission component as described with reference to FIGS. 8 through 12.

Figure 14:
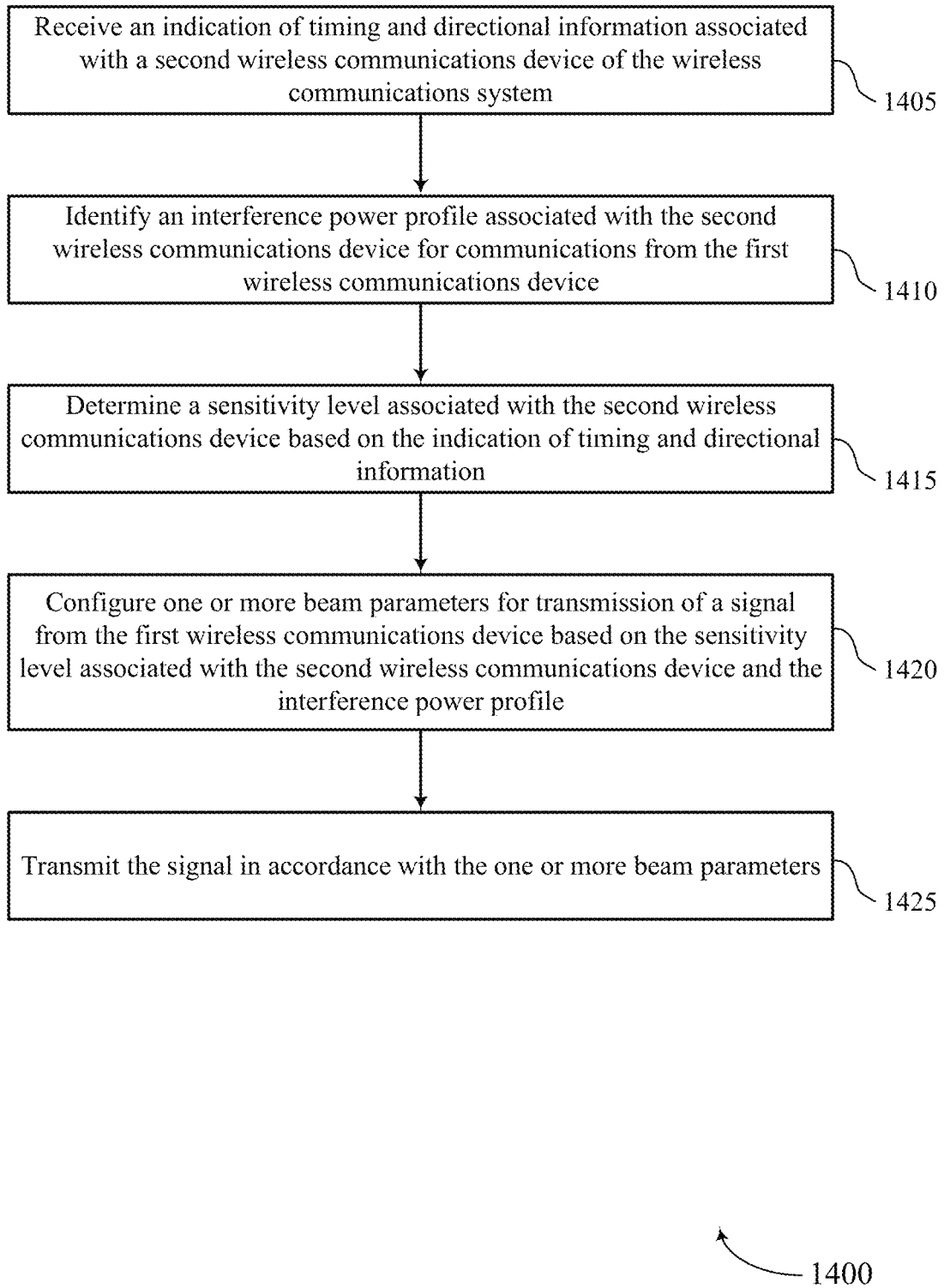

FIG. 14 shows a flowchart illustrating a method 1400 that supports elevation restriction beamforming in wireless systems in accordance with one or more aspects of the present disclosure. The operations of method 1400 may be implemented by a wireless device such as a UE 115 or network device 105 or its components as described herein. For example, the operations of method 1400 may be performed by a beamforming manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1405, the wireless device may receive an indication of timing and directional information associated with a second wireless communications device of the wireless communications system. The operations of 1405 may be performed according to the methods described herein. In some examples, aspects of the operations of 1405 may be performed by an indication component as described with reference to FIGS. 8 through 12.

At 1410, the wireless device may identify an interference power profile associated with the second wireless communications device for communications from the first wireless communications device. The operations of 1410 may be performed according to the methods described herein. In some examples, aspects of the operations of 1410 may be performed by an interference power profiler as described with reference to FIGS. 8 through 12.

At 1415, the wireless device may determine a sensitivity level associated with the second wireless communications device based on the indication of timing and directional information. The operations of 1415 may be performed according to the methods described herein. In some examples, aspects of the operations of 1415 may be performed by a sensitivity manager as described with reference to FIGS. 8 through 12.

At 1420, the wireless device may configure one or more beam parameters for transmission of a signal from the wireless device based on the sensitivity level associated with the second wireless communications device and the interference power profile. The operations of 1420 may be performed according to the methods described herein. In some examples, aspects of the operations of 1420 may be performed by a beam parameter component as described with reference to FIGS. 8 through 12.

At 1425, the wireless device may transmit the signal in accordance with the one or more beam parameters. The operations of 1425 may be performed according to the methods described herein. In some examples, aspects of the operations of 1425 may be performed by a transmission component as described with reference to FIGS. 8 through 12.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless communications device of a wireless communications system, comprising:
    receiving an indication of timing and directional information associated with a second wireless communications device of the wireless communications system, the timing and directional information being associated with a beam transmitted from a plurality of antennas;
    determining a sensitivity level associated with the second wireless communications device based at least in part on the indication of timing and directional information;
    identifying an interference power profile associated with the second wireless communications device for communications from the first wireless communications device;
    configuring one or more beam parameters for transmission of a signal from the first wireless communications device based at least in part on the sensitivity level associated with the second wireless communications device and the interference power profile;
    determining a transmission direction of a main lobe for the transmission of the signal based at least in part on the sensitivity level associated with the second wireless communications device and the interference power profile, the determining the transmission direction of the main lobe being such that the main lobe is steered below a horizon;
    determining a transmission direction of a side lobe for the transmission of the signal based at least in part on the sensitivity level associated with the second wireless communications device and the interference power profile, the determining the transmission direction of the side lobe being such that the side lobe is steered above the horizon and meets a threshold indicated by the interference power profile; and
    transmitting the signal in accordance with the one or more beam parameters.

2. The method of claim 1, wherein the threshold comprises a peak power level threshold, a total transmission power threshold, a total energy over a period of time threshold, or any combination thereof.

3. The method of claim 1, further comprising:
    receiving the indication of timing and directional information associated with the second wireless communications device from a coordinating node.

4. The method of claim 1, wherein the first wireless communications device operates in the same band as the second wireless communications device.

5. The method of claim 4, wherein the first wireless communications device operates using the same channel as the second wireless communications device.

6. The method of claim 1, wherein the first wireless communications device operates in a different band than the second wireless communications device.

7. The method of claim 6, further comprising:
    identifying a correlation parameter associated with a beam direction between bands used by the first wireless communications device and the second wireless communications device; and
    configuring the one or more beam parameters based at least in part on the correlation parameter.

8. The method of claim 1, wherein the first wireless communications device comprises a base station or a customer premises equipment.

9. The method of claim 1, wherein the second wireless communications device comprises a base station, a customer premises equipment, a low-earth orbit (LEO) satellite, a medium-earth orbit (MEO) satellite, a geostationary satellite, a space station receiver, or a fixed Local Multipoint Distribution Service (LMDS) link.

10. A method for wireless communications at a first wireless communications device of a wireless communications system, comprising:
    receiving an indication of timing and directional information associated with a second wireless communications device of the wireless communications system, the timing and directional information being associated with a beam transmitted from a plurality of antennas;
    determining a sensitivity level associated with the second wireless communications device based at least in part on the indication of timing and directional information;
    identifying an interference power profile associated with the second wireless communications device for communications from the first wireless communications device;
    configuring one or more beam parameters for transmission of a signal from the first wireless communications device based at least in part on the sensitivity level associated with the second wireless communications device and the interference power profile;
    identifying one or more beams for wireless communications supported by the first wireless communications device;
    receiving one or more reference signals from a third wireless communications device;
    selecting a beam from the one or more beams for transmission of the signal, the selecting the beam being based at least in part on one or more directions identified based at least in part on the one or more reference signals; and
    transmitting the signal in accordance with the one or more beam parameters.

11. A method for wireless communications at a first wireless communications device of a wireless communications system, comprising:
receiving an indication of timing and directional information associated with a second wireless communications device of the wireless communications system, the timing and directional information being associated with a beam transmitted from a plurality of antennas;
determining a sensitivity level associated with the second wireless communications device based at least in part on the indication of timing and directional information;
identifying an interference power profile associated with the second wireless communications device for communications from the first wireless communications device;
configuring one or more beam parameters for transmission of a signal from the first wireless communications device based at least in part on the sensitivity level associated with the second wireless communications device and the interference power profile;
determining a transmission power of a main lobe for the transmission of the signal based at least in part on the sensitivity level associated with the second wireless communications device and the interference power profile, wherein a transmission direction of the main lobe is above a horizon; and
transmitting the signal in accordance with the one or more beam parameters.

12. An apparatus for wireless communications at a first wireless communications device of a wireless communications system, comprising:
a processor; and
memory coupled with the processor, the processor and memory configured to:
receive an indication of timing and directional information associated with a second wireless communications device of the wireless communications system, the timing and the directional information being associated with a beam transmitted from a plurality of antennas;
determine a sensitivity level associated with the second wireless communications device based at least in part on the indication of timing and directional information;
identify an interference power profile associated with the second wireless communications device for communications from the first wireless communications device;
configure one or more beam parameters for transmission of a signal from the first wireless communications device based at least in part on the sensitivity level associated with the second wireless communications device and the interference power profile;
determine a transmission direction of a main lobe for the transmission of the signal based at least in part on the sensitivity level associated with the second wireless communications device and the interference power profile, wherein the transmission direction of the main lobe is determined such that the main lobe is steered below a horizon; and
determine a transmission direction of a side lobe for the transmission of the signal based at least in part on the sensitivity level associated with the second wireless communications device and the interference power profile, wherein the transmission direction of the side lobe is determined such that the side lobe is steered above the horizon and meets a threshold indicated by the interference power profile; and
transmit the signal in accordance with the one or more beam parameters.

13. The apparatus of claim 12, wherein the processor and memory are further configured to:
receive the indication of timing and directional information associated with the second wireless communications device from a coordinating node.

14. The apparatus of claim 12, wherein the first wireless communications device is configured to operate in the same band as the second wireless communications device.

15. The apparatus of claim 14, wherein the first wireless communications device is configured to operate using the same channel as the second wireless communications device.

16. The apparatus of claim 12, wherein the first wireless communications device is configured to operate in a different band than the second wireless communications device.

17. The apparatus of claim 16, wherein the processor and memory are further configured to:
identify a correlation parameter associated with a beam direction between bands used by the first wireless communications device and the second wireless communications device; and
configure the one or more beam parameters based at least in part on the correlation parameter.

18. The apparatus of claim 12, wherein the first wireless communications device comprises a base station or a customer premises equipment.

19. The apparatus of claim 12, wherein the second wireless communications device comprises a base station, a customer premises equipment, a low-earth orbit (LEO) satellite, a medium-earth orbit (MEO) satellite, a geostationary satellite, a space station receiver, or a fixed Local Multipoint Distribution Service (LMDS) link.

20. An apparatus for wireless communications at a first wireless communications device of a wireless communications system, comprising:
means for receiving an indication of timing and directional information associated with a second wireless communications device of the wireless communications system, the timing and directional information being associated with a beam transmitted from a plurality of antennas;
means for determining a sensitivity level associated with the second wireless communications device based at least in part on the indication of timing and directional information;
means for identifying an interference power profile associated with the second wireless communications device for communications from the first wireless communications device;
means for configuring one or more beam parameters for transmission of a signal from the first wireless communications device based at least in part on the sensitivity level associated with the second wireless communications device and the interference power profile;
means for determining a transmission direction of a main lobe for the transmission of the signal based at least in part on the sensitivity level associated with the second wireless communications device and the interference power profile, wherein the transmission direction of the main lobe is determined such that the main lobe is steered below a horizon;
means for determining a transmission direction of a side lobe for the transmission of the signal based at least in part on the sensitivity level associated with the second wireless communications device and the interference power profile, wherein the transmission direction of the side lobe is determined such that the side lobe is steered above the horizon and meets a threshold indicated by the interference power profile; and means for transmitting the signal in accordance with the one or more beam parameters.

21. The apparatus of claim 20, further comprising:
means for receiving the indication of timing and directional information associated with the second wireless communications device from a coordinating node.

22. The apparatus of claim 20, wherein the first wireless communications device operates in the same band as the second wireless communications device.

23. The apparatus of claim 22, wherein the first wireless communications device operates using the same channel as the second wireless communications device.

24. The apparatus of claim 20, wherein the first wireless communications device operates in a different band than the second wireless communications device.

25. The apparatus of claim 20,
wherein the first wireless communications device comprises a base station or a customer premises equipment; and
wherein the second wireless communications device comprises a base station, a customer premises equipment, a low-earth orbit (LEO) satellite, a medium-earth orbit (MEO) satellite, a geostationary satellite, a space station receiver, or a fixed Local Multipoint Distribution Service (LMDS) link.

26. A non-transitory computer-readable medium storing code for wireless communications at a first wireless communications device of a wireless communications system, the code comprising instructions executable by a processor to:
receive an indication of timing and directional information associated with a second wireless communications device of the wireless communications system, the timing and directional information being associated with a beam transmitted from a plurality of antennas;
determine a sensitivity level associated with the second wireless communications device based at least in part on the indication of timing and directional information;
identify an interference power profile associated with the second wireless communications device for communications from the first wireless communications device;
configure one or more beam parameters for transmission of a signal from the first wireless communications device based at least in part on the sensitivity level associated with the second wireless communications device and the interference power profile;
determine a transmission direction of a main lobe for the transmission of the signal based at least in part on the sensitivity level associated with the second wireless communications device and the interference power profile, wherein the transmission direction of the main lobe is determined such that the main lobe is steered below a horizon;
determine a transmission direction of a side lobe for the transmission of the signal based at least in part on the sensitivity level associated with the second wireless communications device and the interference power profile, wherein the transmission direction of the side lobe is determined such that the side lobe is steered above the horizon and meets a threshold indicated by the interference power profile; and
transmit the signal in accordance with the one or more beam parameters.

27. The non-transitory computer-readable medium of claim 26, the code further comprising instructions executable by the processor to:
receive the indication of timing and directional information associated with the second wireless communications device from a coordinating node.

28. The non-transitory computer-readable medium of claim 26, wherein the first wireless communications device operates in the same band as the second wireless communications device.

29. The non-transitory computer-readable medium of claim 28, wherein the first wireless communications device operates using the same channel as the second wireless communications device.

30. The non-transitory computer-readable medium of claim 26, wherein the first wireless communications device operates in a different band than the second wireless communications device.

* * * * *